(12) United States Patent
Sugasaki

(10) Patent No.: US 7,872,059 B2
(45) Date of Patent: Jan. 18, 2011

(54) COMPOSITION FOR USE IN LASER DECOMPOSITION AND PATTERN-FORMING MATERIAL USING THE SAME

(75) Inventor: Atsushi Sugasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 12/028,035

(22) Filed: Feb. 8, 2008

(65) Prior Publication Data

US 2008/0194762 A1     Aug. 14, 2008

(30) Foreign Application Priority Data

Feb. 14, 2007   (JP) .............................. 2007-033741

(51) Int. Cl.
*C08G 18/02*     (2006.01)

(52) U.S. Cl. .............................. 522/96; 522/2; 524/612; 525/123; 525/909; 525/540

(58) Field of Classification Search ...................... 522/2, 522/96; 525/909, 540, 123; 524/612
See application file for complete search history.

(56) References Cited

U.S. PATENT DOCUMENTS

| 4,421,569 | A | * | 12/1983 | Dichter et al. | .............. | 148/251 |
| 4,424,359 | A | * | 1/1984 | Kaschig et al. | .............. | 546/255 |
| 5,780,578 | A | * | 7/1998 | Mashelkar et al. | .......... | 528/327 |
| 6,171,748 | B1 | * | 1/2001 | Tanaka et al. | ............... | 430/138 |
| 6,646,086 | B2 | * | 11/2003 | Slone | ......................... | 526/319 |

FOREIGN PATENT DOCUMENTS

| BE | 861855 A | * | 6/1978 |
| JP | 8-258442 A | | 10/1996 |
| JP | 10-119436 A | | 5/1998 |
| JP | 10-244751 A | | 9/1998 |

OTHER PUBLICATIONS

BE861855A, Jun. 1978, Derwent AB.*
Handy et al., SPIE vol. 3476, Jul. 1998, pp. 62-66.*

* cited by examiner

*Primary Examiner*—Satya B Sastri
(74) *Attorney, Agent, or Firm*—Sughrue Mion, PLLC

(57) ABSTRACT

A composition for use in laser decomposition includes (A) at least one of a polymer having a nitrogen atom-containing hetero ring and a polymerizable compound having a nitrogen atom-containing hetero ring; and (B) a metal ion.

6 Claims, No Drawings

COMPOSITION FOR USE IN LASER DECOMPOSITION AND PATTERN-FORMING MATERIAL USING THE SAME

BACKGROUND OF THE INVENTION

1. Field of the Invention

The present invention relates to a composition for use in laser decomposition and to a pattern-forming material using the composition and, in particular, to a composition for use in laser decomposition, which can be utilized as a thick film, which has a high engraving sensitivity, which permits effective engraving with a low laser energy, and which has a good resolution, and to the pattern-forming material using the composition.

2. Description of the Related Art

Decomposable resins and decomposable resin compositions are those which undergo decomposition of resin in response to external factors such as a thermal factor, a mechanical factor, a photochemical factor, a radiation chemical factor or a chemical factor, and are widely known. Change in form (liquefaction or gasification) of the resins or compositions before and after their decomposition or change in properties or characteristics such as molecular weight, hardness, viscoelasticity, glass transition point (Tg), solubility or adhesion properties have been utilized in various fields.

Examples of such decomposable resins or decomposable resin compositions include bio-decomposable plastics intended for decreasing environmental influences of plastic materials (e.g., polylactic acid) and sustained-release materials for gradually releasing components such as drugs or perfumes used in the field of medicines and cosmetics or in the field of life science. However, these are gradually decomposable under the natural environment due to oxygen, light or enzyme, in vivo or in soils and are not materials which stably keep the initial state and, when exposed to external stimulation, rapidly undergo great change in properties.

Also, there have been developed resins decomposable by light or heat and adhesives which undergo reduction in adhesion properties in order to improve recycling convenience or simplify waste treatment. Further, it has been known to mix ceramics or carbon fibers with a decomposable resin and remove the decomposable resin by baking or the like to thereby form a porous material. However, these techniques treat and process the materials wholly and not in part to form a necessary pattern in necessary portions. In addition, a large energy is required to perform the decomposition treatment.

As an example of utilizing the techniques to image formation, there are known examples wherein a toner containing a thermally decomposable resin is used and change in properties of the resin due to heat upon heat-fixing is utilized to thereby ensure both storage stability as a toner and image fixing properties. However, the resin itself has not enough responsibility to patternwise stimulation.

On the other hand, as a pattern-forming material, there have widely been known, for example, photo resists which comprise a photo acid generator and an acid-decomposable resin and which, when patternwise exposed and, as needed, heat-treated, undergo patternwise decomposition of the resin, and then development-treated to form a pattern, as so-called chemically amplified resists. Such compositions have both storage stability and pattern-forming properties at practical levels but, for forming a pattern, a development step is necessary wherein processing conditions are sufficiently controlled. In addition, though the techniques can be applied to a thin film, it is difficult to apply them to form a pattern with a thickness of, for example, several ten μm or more.

It has also been known to form an image by utilizing a step of imagewise irradiating with a laser light to remove (ablation) part of a thin film to thereby form an image (JP-A-10-119436 (the term "JP-A" as used herein means an "unexamined published Japanese patent application")). However, it is only common, general-purpose resins such as polyesters, polycarbonates and polyurethanes that are illustrated there as thermally decomposable resins, and the thickness thereof is as small as from about 1 to about 2 μm. In addition, there has been known an example of using a compound whose thermally decomposable properties are specified (JP-A-10-244751). However, with this example, too, the film thickness is as small as from about 1 to about 2 μm.

Further, as a mask material for paste printing onto a print wiring board, there have been disclosed a mask for forming a pattern of from about 100 to 200 μm utilizing a photo-decomposable resin sheet, and a process for its production (JP-A-8-258442). However, this document does not disclose specific compounds, and this technique requires a controlled development processing to form a pattern by adjusting the degrees of exposure and development.

On the other hand, as a technique for forming a pattern on a thick film by simple treatment, there has been known the technique of forming a pattern by, for example, laser processing. In this technique, imagewise irradiation with a laser light is performed to remove the substrate itself or change form or color of the substrate. For example, this technique is utilized to record information such as a lot number on a product (e.g., video tapes or consumer electric products) comprising various substrates. In this case, however, common resins are used as such for the substrates themselves.

Still now, in the technology of forming a pattern on a thick film by laser processing, a composition for use in laser decomposition having an excellent engraving sensitivity and an excellent resolution is being demanded.

SUMMARY OF THE INVENTION

The invention provides a composition for use in laser decomposition, which can be utilized as a thick film, which has a high engraving sensitivity, which permits effective engraving with a low laser energy, and which has a good resolution, and to the pattern-forming material using the composition.

The invention is as follows.

<1> A composition for use in laser decomposition, comprising:

(A) at least one of a polymer having a nitrogen atom-containing hetero ring and a polymerizable compound having a nitrogen atom-containing hetero ring; and (B) a metal ion.

<2> The composition as described in <1>, comprising:

a complex formed from the component (A) and the component (B).

<3> The composition as described in <1>, wherein the component (B) is contained in amount of from 0.05 to 20 mol based on 1 mol of the component (A).

<4> The composition as described in <1>, wherein the component (A) is the polymer having a nitrogen-containing hetero ring.

<5> The composition as described in <4>, wherein the polymer having a nitrogen-containing hetero ring comprises at least one of a polyurethane resin and an acryl resin.

<6> The composition as described in <4>, wherein the polymer having a nitrogen-containing hetero ring is a polyurethane resin containing, in a main chain thereof, the nitrogen atom-containing hetero ring as a repeating unit.

<7> The composition as described in <1>, wherein the component (A) is both the polymer having a nitrogen atom-containing hetero ring and the polymerizable compound having a nitrogen atom-containing hetero ring.

<8> The composition f as described in <1>, further comprising:

a polymerizable compound other than the component (A).

<9> A composition for use in laser decomposition, which is obtained by cross-linking the composition as described in <1> by light or heat.

<10> A pattern-forming material comprising:

a support; and a layer that comprises the composition as described in <1>.

<11> The pattern-forming material as described in <10>, which is a laser engravable flexographic printing plate precursor.

The working mechanism in the invention is not certain, but may be surmised as follows.

When the nitrogen atom of the nitrogen atom-containing hetero ring coordinates to the metal ion, (1) the electron density of the nitrogen atom-containing ring is decreased, and displacement of electron density occurs with respect to the single bond directly connected to this hetero ring and, as a result, the bond becomes liable to be thermally cleaved; and/or (2) with the reduction in electron density of the nitrogen atom-containing hetero ring, electron density of adjacent atoms is reduced as well and, in the case where some chemical bond exists adjacent to the atoms, displacement of electron density occurs with respect to the chemical bond itself or with respect to the single bond between the chemical bond and an atom adjacent to the hetero ring and, as a result, the bond becomes liable to be cleaved. From these phenomena, the composition of the invention for use in laser decomposition is considered to have a high engraving sensitivity and permit effective engraving with low laser energy.

Also, with respect to another effect of the invention that engraved portions have good sharpness (good resolution), it is surmised that plural hetero rings coordinate to one and the same metal ion, i.e., that plural molecules of the component (A) form a cross-linked structure through the component (B). In the case where the component (A) is used independently or a general-purpose resin is used independently, laser light-irradiated areas are heated to such a high temperature that the resin becomes softened and, therefore, it is difficult to obtain engraved depressions with a sharp pattern. On the other hand, like in the invention, copresence of the component (A) and the component (B) serves to form a cross-linked structure due to formation of complex and, even when the laser light-irradiated areas are heated to a high temperature, softening of the resin is difficult to occur, thus engraved depressions acquiring a sharp pattern.

In other words, it can be described as follows.

When only the component (A) or a general-purpose resin is used, there tends to result the relation of softening temperature of the composition (relating to edge shape)<thermal decomposition of the composition (relating to engraving sensitivity) and, since the thermal decomposition temperature is high, the engraving sensitivity tends to be low and, since the softening temperature is low, the edge shape tends to be bad.

Copresence of the component (A) and the component (B) as in the invention is considered to promote realization of the relation of thermal decomposition of the composition (relating to engraving sensitivity)<softening temperature of the composition (relating to edge shape) and, since the thermal decomposition temperature is low, the engraving sensitivity is high and, since thermal decomposition occurs before softening of the composition occurs, there is obtained the effect of not causing deterioration of the edge shape due to the softening.

DETAILED DESCRIPTION OF THE INVENTION

The composition of the invention for use in laser decomposition contains at least (A) a polymer having a nitrogen atom-containing hetero ring and/or a polymerizable compound having a nitrogen atom-containing hetero ring and (B) a metal ion.

Individual components contained in the composition for use in laser decomposition (hereinafter merely referred to as "composition") will be described in detail hereinafter.

[Polymer Having a Nitrogen Atom-Containing Hetero Ring and/or a Polymerizable Compound Having a Nitrogen Atom-Containing Hetero Ring (Component A)]

With the component (A), the nitrogen atom-containing hetero ring includes diazole rings such as pyrazole and imidazole, pyridine ring, diazine rings such as pyrimidine ring and pyridazine ring, triazine rings, bipyridine rings, 1,10-phenanthroline rings, pyrrolidone rings, pyrimidinone rings, uracil ring, guanine ring, adenine ring, thymine ring, porphyrin ring, phthalocyanine ring, terpyridine rings, naphthyridine rings and thiadiazole rings, which, however, are not limitative at all. In view of convenience in synthesizing the component (A), pyridine ring, bipyridine rings, 1,10-phenanthroline rings and pyrimidine ring are preferred, pyridine ring, bipyridine rings, and 1,10-phenanthroline rings are more preferred, and pyridine ring and bipyridine rings are particularly preferred.

As the polymer having a nitrogen atom-containing hetero ring to be used as the component (A), polymers having a nitrogen atom-containing hetero ring as a repeating unit are preferred. With such compounds, the nitrogen atom-containing hetero ring may be introduced either into the main chain or into side chain but, in view of enhancing thermally decomposable properties based on the mutual action with the metal ion (B), the ring is preferably introduced into the main chain.

Also, when the component (A) is the polymer, polyester resin, polyurethane resin or acryl resin is particularly preferred. In view of ease of synthesis of resin, preferred polyurethane resin contains the nitrogen atom-containing hetero ring in the main chain thereof, and preferred acryl resin contains the nitrogen atom-containing hetero ring in the side chain thereof. Particularly preferred is polyurethane resin containing the nitrogen atom-containing hetero ring as a repeating unit.

The weight-average molecular weight of the polymer to be used as the component (A) is preferably from 5,000 to 1,000,000, more preferably from 10,000 to 200,000.

In view of maintaining good film properties, the amount of the repeating unit having the nitrogen atom-containing hetero ring introduced into the polymer is preferably from 1 to 90 mol %, more preferably from 5 to 70 mol %, particularly preferably from 10 to 50 mol %, taking the total mol number of the starting materials (monomers) constituting the polymer as 100 mol %.

As the polymerizable compound having a nitrogen-containing hetero ring to be used as the component (A), there are illustrated addition polymerizable compounds having at least one ethylenically unsaturated double bond, which are selected from among compounds having at least one, preferably two or more, terminal ethylenically unsaturated bonds. These are in a chemical form of a monomer, a prepolymer, i.e., a dimmer, a trimer or an oligomer, or a copolymer thereof or a mixture thereof. The polymerizable compounds as the component (A) are easily polymerized by decomposition of the initiator illustrated below. Additionally, in the invention, it is also possible to use a polymerizable compound (D) to be illustrated below in addition to the polymerizable compound of the component (A). In view of resolution, however, all of the polymerizable compounds contained in the composition are preferably compounds of the component (A).

The molecular weight of the polymerizable compound to be used as the component (A) is preferably from 100 to 3,000, more preferably from 150 to 2,000, particularly preferably from 200 to 1,000.

As the polymer and the polymerizable compound to be used as the component (A), either commercially available ones or those which are synthesized by known processes using a compound having a nitrogen atom-containing hetero ring may be used.

As the component (A) of the invention, an embodiment of using the polymer having in combination a nitrogen atom-containing hetero ring and the polymerizable compound having a nitrogen atom-containing hetero ring is most preferred in view of obtaining a high thermal decomposability, i.e., laser decomposability. In this embodiment of the combined use, the ratio of the polymer to the polymerizable compound (the former:the latter) is preferably from 90:10 to 10:90, more preferably from 80:20 to 20:80, particularly preferably from 65:35 to 35:65, by weight.

Next preferred is an embodiment wherein the component (A) is the polymer having a nitrogen atom-containing hetero ring, and still next preferred is an embodiment wherein the component (A) is the polymerizable compound having a nitrogen atom-containing hetero ring.

Specific preferred examples of the component (A) of the invention are shown below. Additionally, in the following structural formulae, all monomer compositions are by mol %, and Mw means a weight-average molecular weight.

Specific examples of the polymer to be used as the component (A) are illustrated below which, however, are not limitative at all.

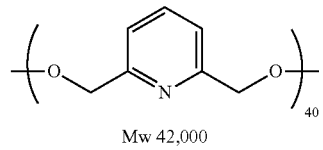

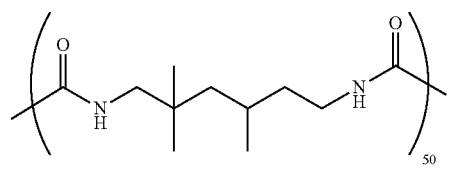

-continued

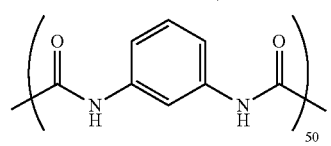

Mw 42,000

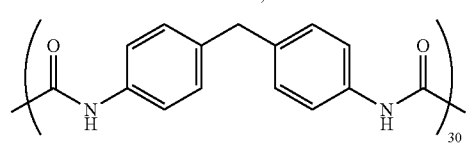

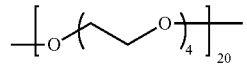

Mw 36,000

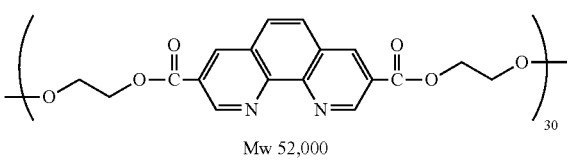

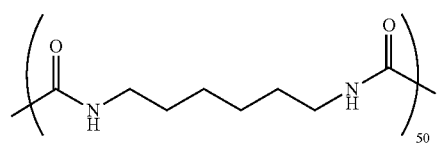

Mw 63,000

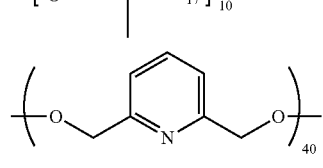

Mw 52,000

Mw 26,000

-continued
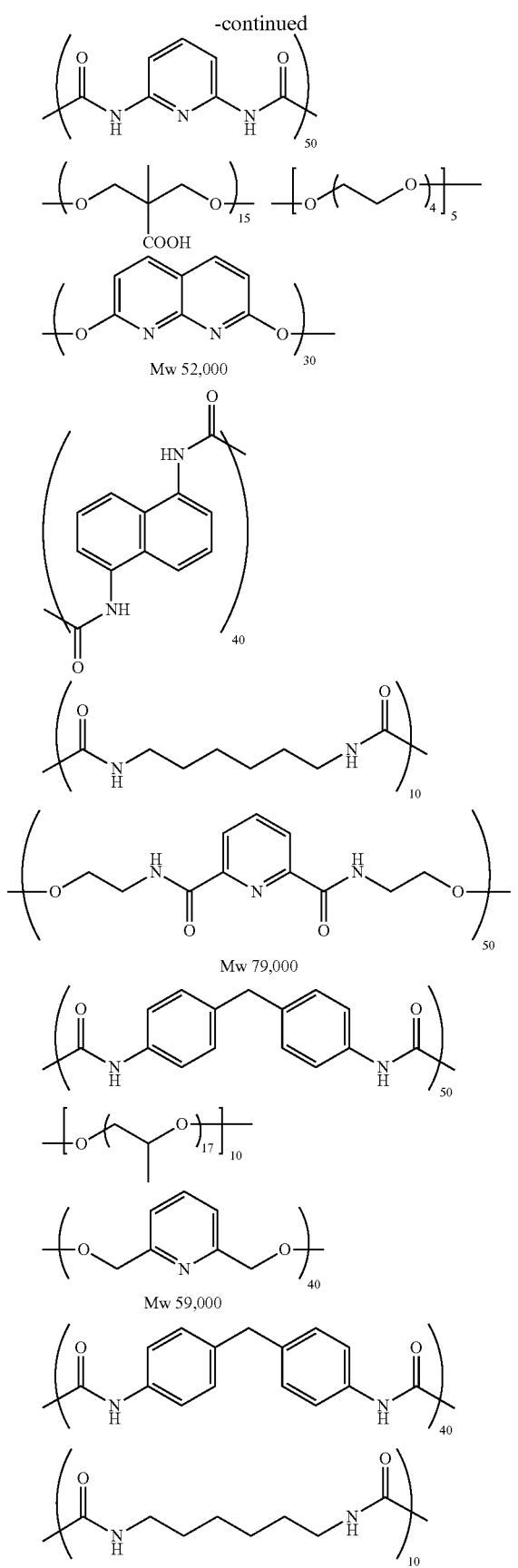
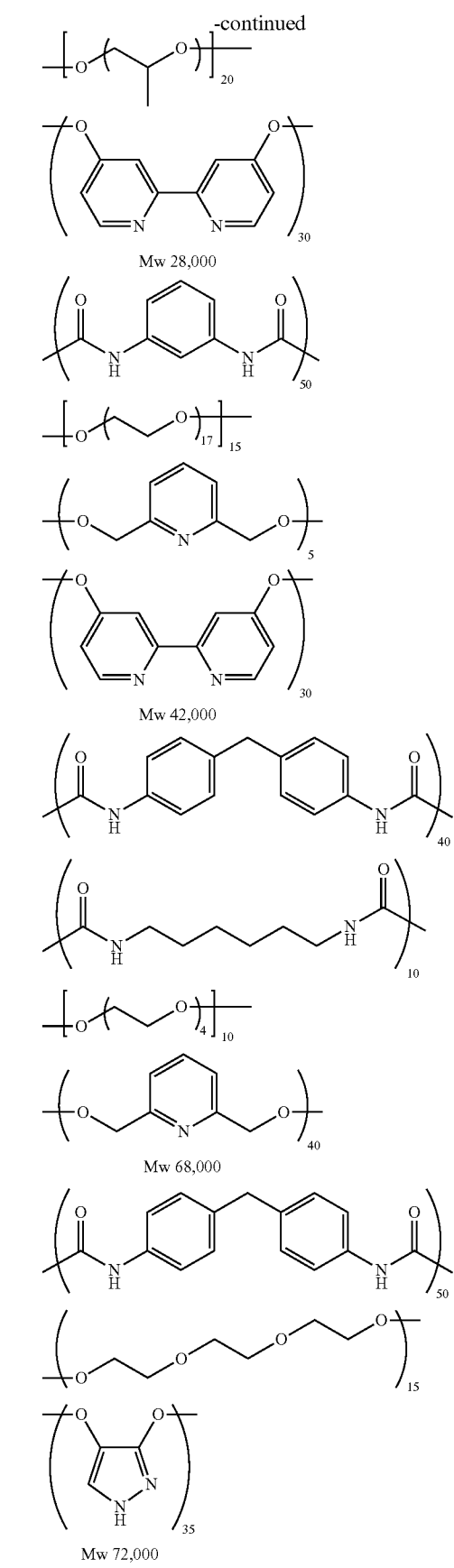

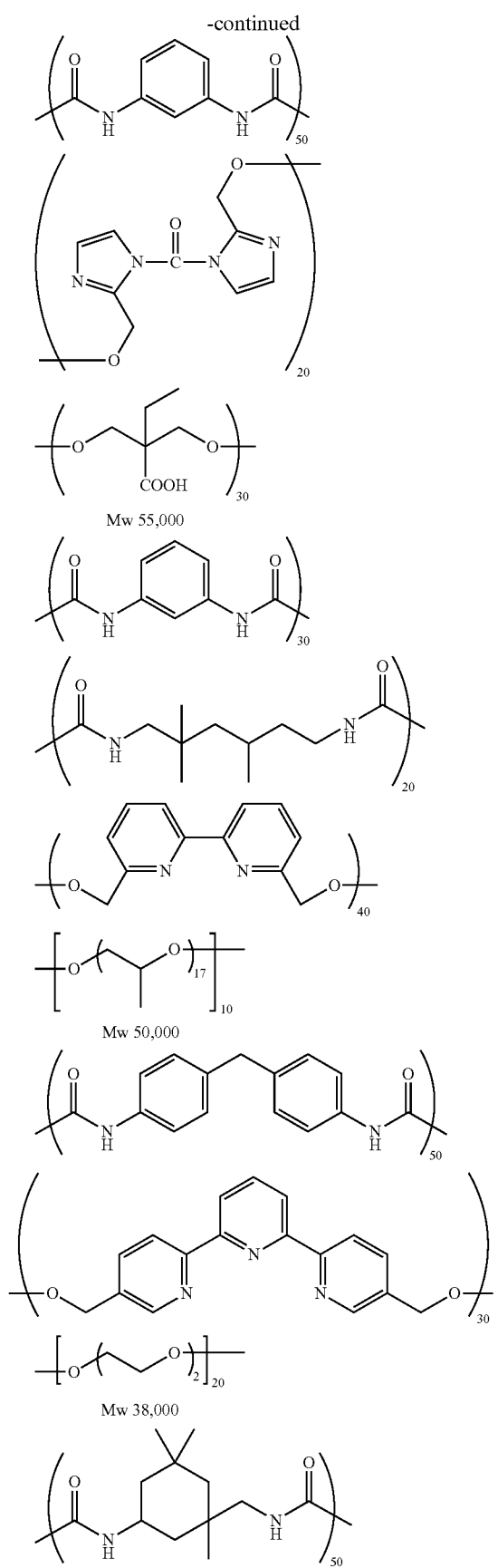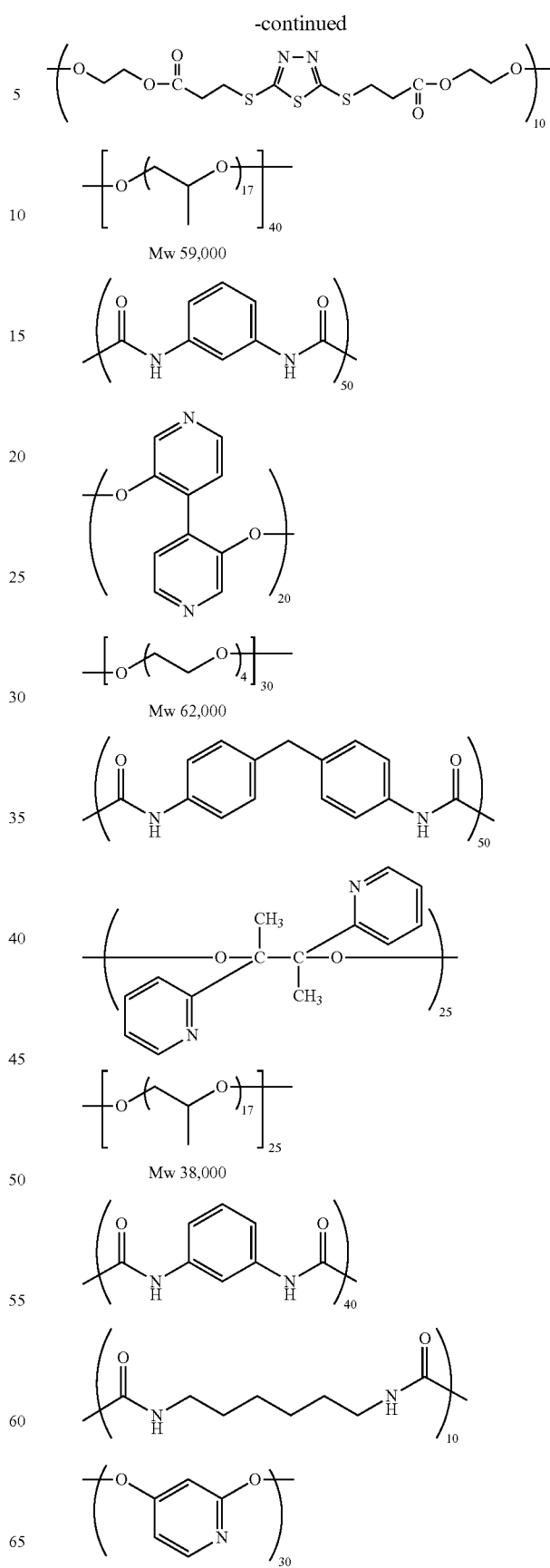

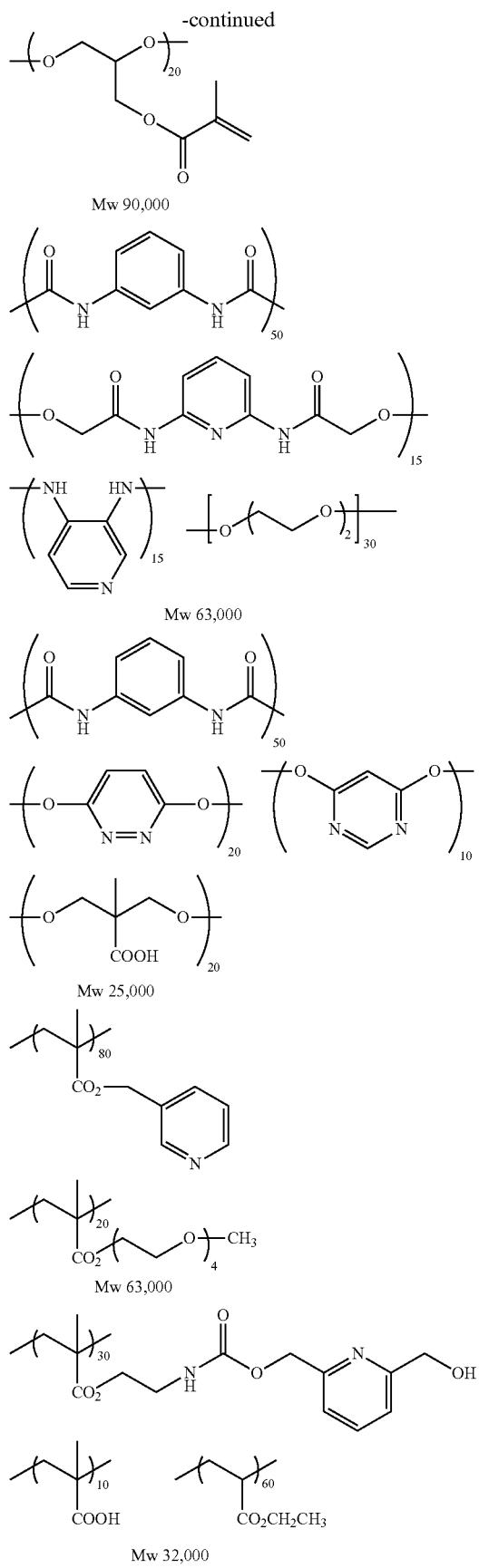
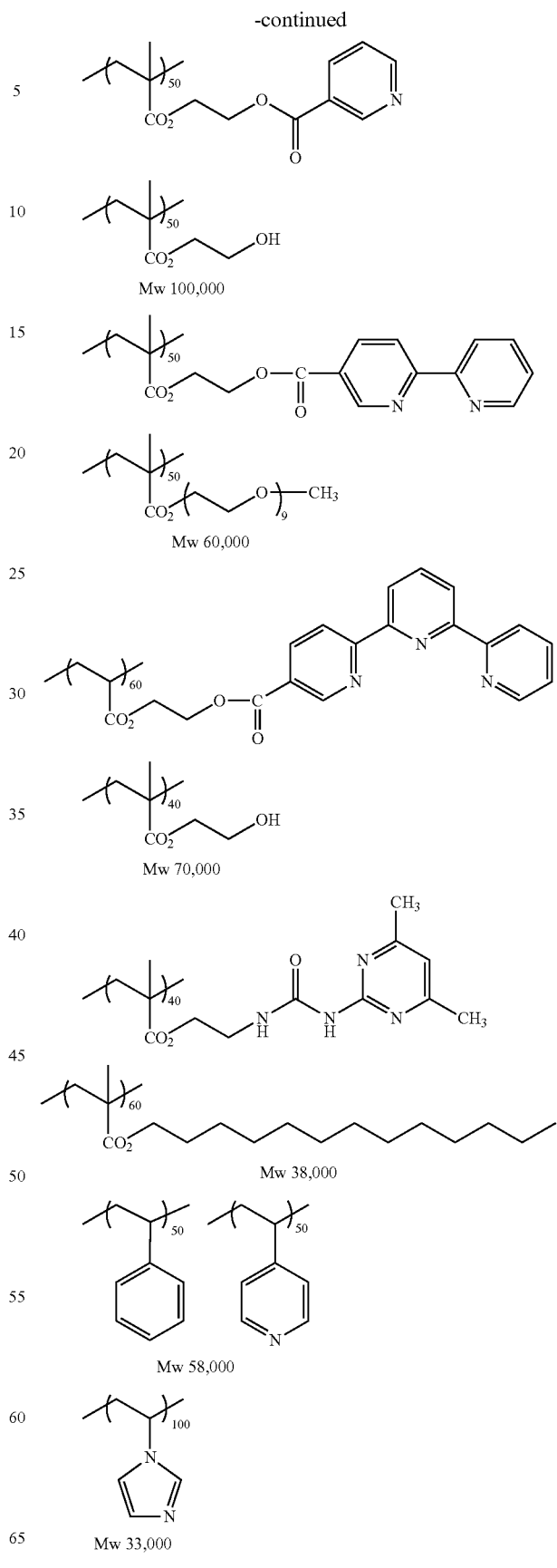

-continued
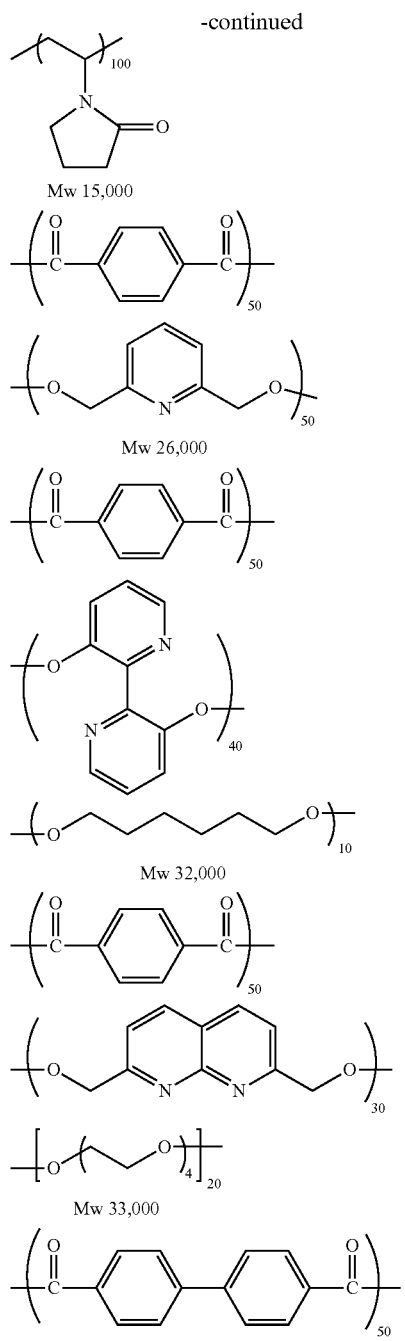
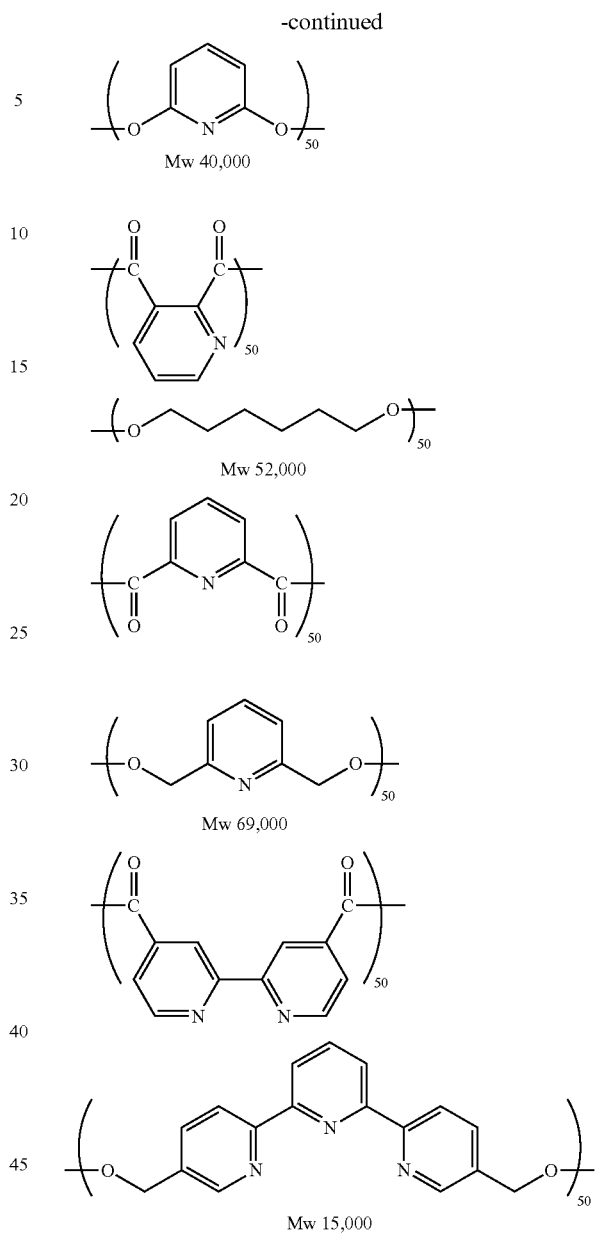
Specific examples of the polymerizable compound to be used as the component (A) are illustrated below which, however, are not limitative at all.
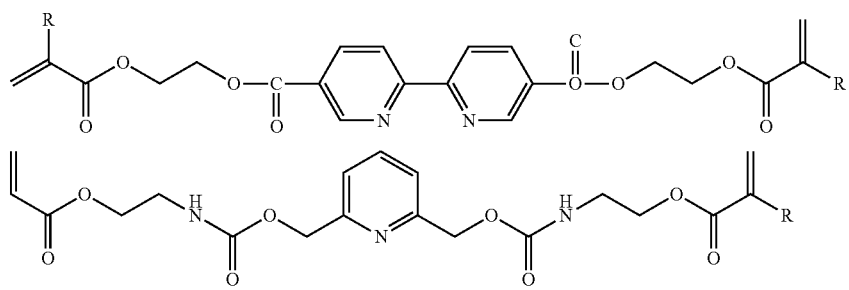

-continued
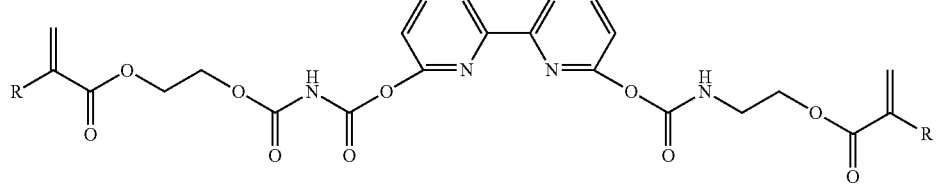
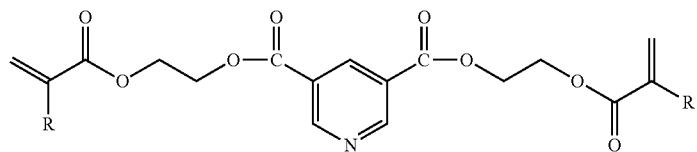
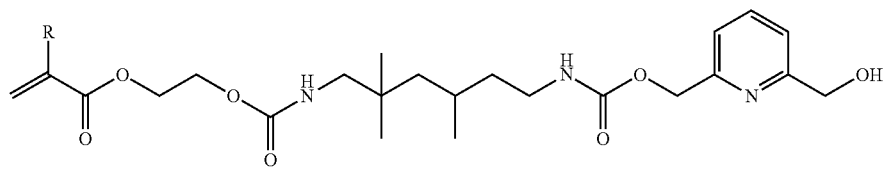
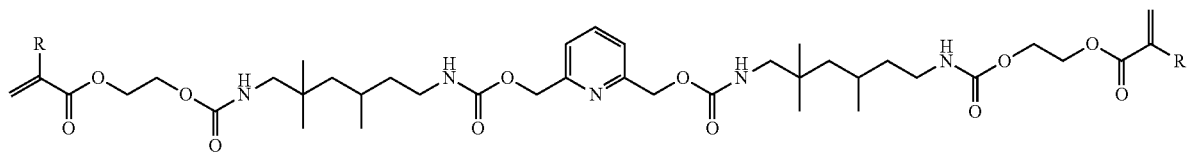
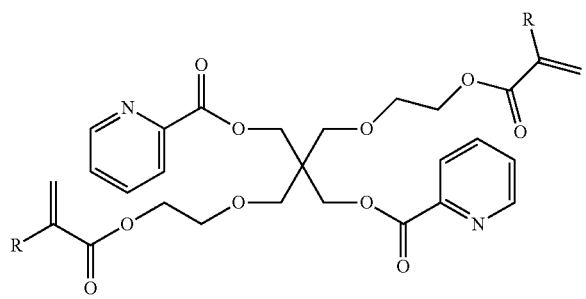
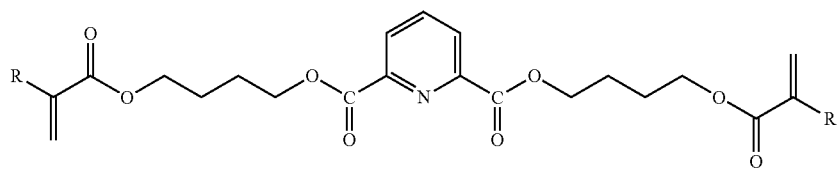
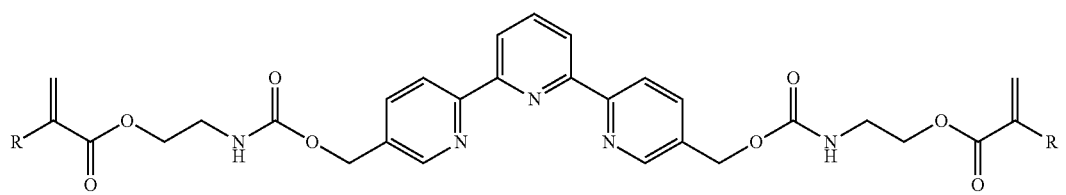

-continued

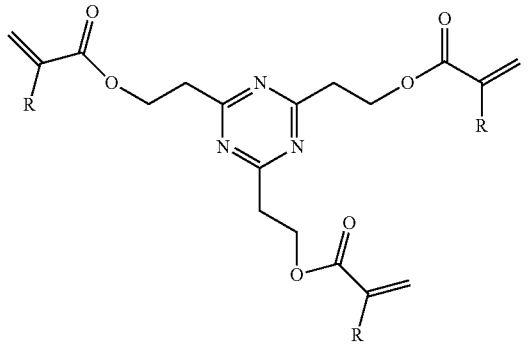

R = H or CH₃

Most preferably, the component (A) has the partial structure represented by the following general formula (1).

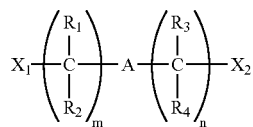

In the general formula (1), $X_1$ and $X_2$, which may be the same or different, each represents a chemical bond, and are specifically bonds selected from among a urethane bond, a urea bond, an ester bond, an ether bond, a thioether bond, an amido bond, a biuret bond, and an allophanate bond. $R_1$ to $R_4$, which may be the same or different, each represents a hydrogen atom or an alkyl group which may have a substituent and, in view of ease of forming a complex, a hydrogen atom is particularly preferred. A represents a nitrogen atom-containing hetero ring. m and n each represents an integer of 1 or 2 and, from the standpoint of maintaining thermally decomposable properties (laser decomposition sensitivity) at a high level, m and n are preferably 1. It is particularly preferred that at least one of $X_1$ and $X_2$ represents a urethane bond. Most preferred is an embodiment wherein the above general formula (1) is represented by the following general formula (2).

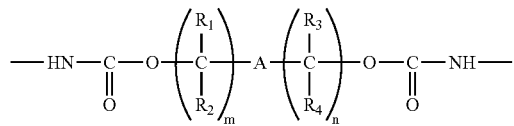

A, m, n, and $R_1$ to $R_4$ are the same as those in the general formula (1), respectively.

The content of the component (A) based on the total weight of the composition is preferably from 1 to 80% by weight, more preferably from 10 to 70% by weight, particularly preferably from 20 to 60% by weight.

Additionally, in view of maintaining film properties upon pattern formation, the unit having the nitrogen atom-containing hetero ring exists in a content of preferably from 0.01 to 550 mmols, more preferably from 0.05 to 100 mmols, particularly preferably from 0.10 to 30 mmols, in 1 g of the component (A).

[Metal Ion (Component B)]

As a metal ion of the component (B) to be used in the invention, there are illustrated ions of cobalt, nickel, palladium, ruthenium, silver, platinum, and iron.

As to the valence number of the metal ion, 1 to 3 valence numbers are preferred in view of ease of forming a complex with the component (A).

As the metal ion, Co(II), Pd(II), Cu(I), Cu(II), Fe(II), and Fe(III) are preferred and, in view of ease of forming a complex with the component (A), Co(II), Pd(II), Cu(I), and Cu(II) are more preferred, with Co(II) and Pd(II) being particularly preferred.

As a counter ion for the metal ion, a monovalent ion is preferred in view of ease of forming a complex with the component (A). This counter ion may be a halide ion or an organic ligand, and is preferably a monovalent halogen ion or organic ligand, more preferably a monovalent halogen ion.

The content of the component (B) based on the total weight of the composition can properly be selected depending upon the content of the component (A) (in the case where the component (A) is a polymer, the content of a starting material of the unit having the nitrogen atom-containing hetero ring).

That is, in the point of the component (A) and the component (B) being able to effectively form the complex and in the point that good film properties can be maintained, the content of the component (B) is generally from 0.05 to 20 equivalents based on the mol number of the unit of the nitrogen atom-containing hetero ring, contained in the component (A) (i.e., from 0.05 to 20 mols per mol of the unit of the nitrogen atom-containing hetero ring), preferably from 0.1 to 20 equivalents, more preferably from 0.5 to 10 equivalents, particularly preferably from 1.0 to 5 equivalents.

Next, complexes formed from the component (A) and the component (B) will be described below.

The complexes can be synthesized by mixing the component (A) with the component (B) in an appropriate solvent. As a solvent, there are illustrated, for example, tetrahydrofuran, 2-butanone, acetone, 1-methoxy-2-propanol, ethanol, methanol, ethyl acetate, cyclohexanone, dioxane, dimethylsulfoxide, N,N-dimethylacetamide, N,N-dimethylformamide, 1-methyl-2-pyrrolidinone, and a mixed solvent thereof. In the point of low boiling point and stably giving a good film at a comparatively low temperature, tetrahydrofuran, 2-butanone, acetone, ethanol, methanol, ethyl acetate, cyclohexanone and a mixed solvent thereof are preferred, with tetrahydrofuran, 2-butanone, acetone, cyclohexanone, and a mixed solvent thereof being particularly preferred.

In the case where the component (A) is the polymer, the complex can also be formed by a process of mixing the component (B) with the component (A) in a molten state and, in the case where the component (A) is the polymerizable compound, the complex can also be formed by a process of melting a binder polymer (C) to be used together and dispersing the component (A) and the component (B) in the molten binder polymer. Among them, the process of mixing the component (A) with the component (B) in an appropriate solvent is preferred in the point that it ensures formation of the complex at a molecular level.

Identification of formation of the complex can be made possible by using $^1$H-NMR and absorption spectrum. With $^1$H-NMR, most of the complexes show a distinct lower magnetic field shift with respect to the proton directly bound to the nitrogen atom-containing hetero ring of the component (A) and/or the proton directly bound to the carbon atom adjacent to the nitrogen atom-containing hetero ring, which results from formation of the complexes with the component (B). With absorption spectrum, there is observed a shift of the maximum absorption wavelength of the component (A) (shift to a shorter wavelength side or to a longer wavelength side) or generation of a new absorption peak (resulting from mutual action between the nitrogen atom-containing hetero ring and the metal ion) which results from formation of the complexes with the component (B). However, these are not limitative, and methods generally employed for identifying a metal complex or a coordination bond-containing compound can be employed with no limitations.

The composition of the invention may contain binder polymer (C), polymerizable compound (D) (monomer), an initiator and, as needed, other various components in addition to the component (A) and the component (B). Hereinafter, the binder polymer (C), the polymerizable compound (D) (monomer), the initiator, and other components will be described.

Binder polymer (C): The composition of the invention can contain the binder polymer (C) in addition to the polymer of the component (A). As the binder polymer (C), those binder polymers are preferred which have a carbon-carbon unsaturated bond in at least either of the main chain and the side chain thereof. Polymers having at least either of an olefin (carbon-carbon double bond) and a carbon-carbon triple bond in the main chain thereof is more preferred in the point that it serves to form a film with a high mechanical strength, with polymers having an olefin in the main chain thereof being particularly preferred.

As polymers having at least either of an olefin and a carbon-carbon triple bond in the main chain thereof, there are illustrated, for example, SB (polystyrene-polybutadiene), SBS (polystyrene-polybutadiene-polystyrene), SIS (polystyrene-polyisoprene-polystyrene), and SEBS (polystyrene-polyethyloene/polybutylene-polystyrene).

In the case where polymers having a highly reactive, polymerizable, unsaturated group such as a methacryloyl group are used as the polymers having a carbon-carbon unsaturated bond in the side chain thereof, there can be prepared a film with an extremely high mechanical strength. In particular, with polyurethane series or polyester series thermoplastic elastomers, it is possible to introduce into the molecule a highly reactive, polymerizable, unsaturated group comparatively easily. The term "to introduce into the molecule" as used herein includes the case where the polymerizable, unsaturated group is directly bound to both ends, or to one end, of the polymer, an end of side chain of the polymer or to a middle portion of the main chain or side chain thereof. For example, it is possible to use a polymer obtained by directly introducing a polymerizable, unsaturated group into the end of the molecule. As an alternative method, there is preferably illustrated a method of reacting a compound of several thousands in molecular weight having plural reactive groups such as a hydroxyl group, an amino group, an epoxy group, a carboxyl group, an acid anhydride group, a ketone group, a hydrazine residue, an isocyanato group, an isothiocyanato group, a cyclic carbonate group or an ester group with a binder having plural groups capable of reacting with the above-described reactive group (e.g., polyisocyanate where the reactive group is a hydroxyl group or an amino group) and, after adjusting the molecular weight and converting the terminal group to a binding group, reacting with an organic compound having a group capable of reacting with this terminal binding group and having a polymerizable, unsaturated group to thereby introduce the polymerizable, unsaturated group into the end of the molecule.

The binder polymer (C) which the composition of the invention contains is preferably a polymer having a carbon-carbon unsaturated bond as described above. However, polymers not having such carbon-carbon unsaturated bond may also be used. As the polymers not having such carbon-carbon unsaturated bond, there are illustrated, for example, resins obtained by adding hydrogen to the olefin portion of the above-described polymer having the carbon-carbon unsaturated bond, and resins which can easily be synthesized by using a starting material having previously been subjected to hydrogenation of the olefin portion (for example, a compound obtained by hydrogenating butadiene or isoprene).

The weight-average molecular weight of the binder polymer is preferably from 1,000 to 1,000,000, more preferably from 5,000 to 500,000. When the weight-average molecular weight is in the range of from 1,000 to 1,000,000, sufficient mechanical strength of the formed film can be ensured. The weight-average molecular weight is determined by measuring using gel permeation chromatography (GPC) and comparing the result with polyethylene standard samples whose molecular weights are known.

The total content of the binder polymer including the polymer of the component (A) is generally from 1 to 99% by weight, preferably from 5 to 80% by weight, based on the whole solid components in the composition.

Additionally, the above-described polymers having the carbon-carbon unsaturated bond may be used in combination with the following general resins.

The addition amount of the resin to be used in combination is generally from 1 to 90% by weight, preferably from 5 to 80% by weight, based on the polymer having the carbon-carbon unsaturated bond.

As to kind of the resins to be used in combination with the polymer having the carbon-carbon unsaturated bond, the resins may be elastomers or non-elastomers.

The weight-average molecular weight of the resin to be used in combination with the polymer having the carbon-carbon unsaturated bond is in the range of preferably from 1,000 to 1,000,000, more preferably from 5,000 to 500,000. When the weight-average molecular weight is in the range of from 1,000 to 1,000,000, sufficient mechanical strength of the formed film can be ensured. The weight-average molecular weight is determined by measuring using gel permeation chromatography (GPC) and comparing the result with polyethylene standard samples whose molecular weights are known.

As the resins, those resins are preferred which are easily liquefied or easily decomposable. The easily decomposable resins preferably contain in the molecular chain styrene, α-methylstyrene, α-methoxystyrene, acrylic ester, methacrylic ester, ester compound, ether compound, nitro compound, carbonate compound, carbamoyl compound, hemiacetal ester compound, oxyethylene compound or alicyclic compound as an easily decomposable monomer unit. In particular, polyethers such as polyethylene glycol, polypropylene glycol, and polytetraethylene glycol, aliphatic polycarbonates, aliphatic carbamates, polymethyl methacrylate, polystyrene, nitrocellulose, polyoxyethylene, polynorbornene, a hydrogenation product of polycyclohexadiene, and polymers having many branched structures such as dendrimers are typical examples of easily decomposable resins. Also, polymers having many oxygen atoms in the molecular chain are preferred in view of decomposability. Of these, compounds having a carbonate group, a carbamate group or a methacryl group in the main chain of the polymer are preferred due to their high thermal decomposability. For example, polyesters or polyurethanes synthesized from (poly)carbonate diols or (poly)carbonate dicarboxylic acids and polyamides synthesized from (poly)carbonate diamines can be illustrated as examples of the polymers having a good thermal decomposability. These polymers may have a polymerizable, unsaturated group in the main chain or side chain thereof. In particular, with resins having a reactive functional group such as a hydroxyl group, an amino group or a carboxyl group, it is easy to introduce thereinto a polymerizable, unsaturated group.

The thermoplastic elastomers are not particularly limited, and are exemplified by urethane series thermoplastic elastomers, ester series thermoplastic elastomers, amide series thermoplastic elastomers, and silicone series thermoplastic elastomers. It is also possible to use polymers having introduced into the main chain thereof an easily decomposable functional group such as a carbamoyl group or a carbonate group having a high decomposability in order to improve thermal decomposability. Further, it is also possible to use them as a mixture with a polymer having a higher thermal decomposability. Since the thermoplastic elastomers are fluidized by heating, they can be well mixed with the composite body to be used in the invention. The thermoplastic elastomers are materials which are fluidized by heating and permit molding processing similarly with common thermoplastic plastics and, at an ordinary temperature, show rubber elasticity. Regarding molecular structure, they comprise a soft segment such as polyether or rubber molecule and a hard segment which, at about ordinary temperature, prevents plastic deformation similarly with vulcanized rubber. As the hard segment, there exist various types such as frozen phase, crystal phase, hydrogen bond and ion cross-linking.

The kind of the thermoplastic elastomer can be selected according to the use of the composition. For example, in the field where solvent resistance is required, urethane series, ester series, amide series and fluorine-containing thermoplastic elastomers are preferred and, in the field where heat resistance is required, urethane series, olefin series, ester series, and fluorine-containing thermoplastic elastomers are preferred. In addition, hardness can be greatly changed by selecting the kind of the thermoplastic elastomer.

The non-elastomer type thermoplastic resins are not particularly limited, and are exemplified by polyester resin, unsaturated polyester resin, polyamide resin, polyamide-imide resin, polyurethane resin, unsaturated polyurethane resin, polysulfone resin, polyether sulfone resin, polyimide resin, polycarbonate resin, and fully aromatic polyester resin.

Also, as a resin to be used in combination with the in combination with the polymer having the carbon-carbon unsaturated bond, hydrophilic polymers may be used. As such hydrophilic polymers, there are illustrated, for example, hydrophilic polymers having hydroxyethylene as a constituting unit. Specifically, there can be illustrated polyvinyl alcohol and vinyl alcohol/vinyl acetate copolymer (partially saponified polyvinyl alcohol) and the modified products thereof. As the hydrophilic polymers, a single polymer may be used, or a mixture of plural hydrophilic polymers may be used. As examples of the modified products, there are illustrated polymers wherein at least part of hydroxyl groups are modified to carboxyl groups, polymers wherein part of hydroxyl groups are modified to (meth)acryloyl groups, polymers wherein at least part of hydroxyl groups are modified to amino groups, and polymers into which ethylene glycol, propylene glycol or a dimer thereof is introduced.

The polymers wherein at least part of hydroxyl groups are modified to carboxyl groups can be obtained by esterifying polyvinyl alcohol or partially saponified polyvinyl alcohol with a multi-functional carboxylic acid such as succinic acid, maleic acid or adipic acid.

Polymers wherein at least part of hydroxyl groups are modified to (meth)acryloyl groups can be obtained by adding a glycidyl group-containing, ethylenically unsaturated monomer to the above-described carboxyl group-modified polymer or by esterifying the partially saponified polyvinyl alcohol with (meth)acrylic acid.

The polymers wherein at least part of hydroxyl groups are modified to amino groups can be obtained by esterifying polyvinyl alcohol or partially saponified polyvinyl alcohol with an amino group-containing carboxylic acid such as carbamic acid.

Polymers into which ethylene glycol, propylene glycol or a dimer thereof is introduced can be obtained by heating polyvinyl alcohol or partially saponified polyvinyl alcohol and a glycol in the presence of a sulfuric acid catalyst and removing a by-product of water out of the reaction system.

Of these polymers, polymers wherein at least part of hydroxyl groups are modified to (meth)acryloyl groups are particularly preferably used. Because, the strength of a formed film can be enhanced by directly introducing unreacted, cross-linkable functional groups into the polymer component, thus the formed film acquiring both flexibility and strength.

The weight-average molecular weight (in terms of polystyrene by GPC measurement) of the hydrophilic polymer is preferably from 10,000 to 500,000. When the weight-average molecular weight is 10,000 or more, the polymer has excellent shape-holding properties and, when the weight-average molecular weight is 500,000 or less, the polymer is readily soluble in a solvent such as water and is therefore convenient for preparing a cross-linkable composition.

Also, as a resin to be used in combination with the polymer having the carbon-carbon unsaturated bond the thermoplastic resin, solvent-soluble resins may be used. Specifically, there can be illustrated polysulfone resin, polyether sulfone resin, epoxy resin, alkyd resin, polyolefin resin, and polyester resin.

The resin to be used in combination with the polymer usually does not have a highly reactive, polymerizable, unsaturated group, but may have a highly reactive, polymerizable, unsaturated group in the end or the side chain of the molecule. In the case of using a polymer having a highly reactive, polymerizable, unsaturated group such as a methacryloyl group, there can be prepared a film having an extremely high mechanical strength. In particular, polyurethane series or polyester series thermoplastic elastomers permit to introduce a highly reactive, polymerizable, unsaturated group into the molecule comparatively simply. The term "to introduce into the molecule" as used herein includes the case where the polymerizable, unsaturated group is directly bound to both ends, or to one end, of the polymer, an end of side chain of the polymer or to a middle portion of the main chain or side chain thereof. For example, it is possible to use a polymer obtained by directly introducing a polymerizable, unsaturated group into the end of the molecule. As an alternative method, there is preferably illustrated a method of reacting a compound of several thousands in molecular weight having plural reactive groups such as a hydroxyl group, an amino group, an epoxy group, a carboxyl group, an acid anhydride group, a ketone group, a hydrazine residue, an isocyanato group, an isothiocyanato group, a cyclic carbonate group or an ester group with a binder having plural groups capable of reacting with the above-described reactive group (e.g., polyisocyanate where the reactive group is a hydroxyl group or an amino group) and, after adjusting the molecular weight and converting the terminal group to a binding group, reacting with an organic compound having a group capable of reacting with this terminal binding group and having a polymerizable, unsaturated group to thereby introduce the polymerizable, unsaturated group into the end of the molecule.

Binder Polymer (D) (Monomer)

The polymerizable compounds to be used in the invention are preferably addition polymerizable compounds having at least one ethylenically unsaturated double bond and are selected from compounds having at least one, preferably two or more, terminal, ethylenically unsaturated bonds.

Such compounds are widely known in this industrial field and, in the invention, these can be used with no particular limitations. They are in a chemical form of monomer, prepolymer, i.e., dimer, trimer or oligomer, copolymer thereof, or a mixture thereof. Examples of the monomer include unsaturated carboxylic acids (e.g., acrylic acid, methacrylic acid, itaconic acid, crotonic acid, isocrotonic acid, and maleic acid), and esters and amides thereof. Preferably, esters between an unsaturated carboxylic acid and an aliphatic polyhydric alcohol compound and amides between an unsaturated carboxylic acid and an aliphatic polyamine compound are used. In addition, unsaturated carboxylic acid esters having a nucleophilic substituent such as a hydroxyl group, an amino group or a mercapto group, addition reaction products between an amide and a mono- or multi-functional isocyanate or an epoxy compound, and dehydration condensation reaction products between an amide and a mono- or multi-functional carboxylic acid are also preferably used. Further, unsaturated carboxylic acid esters having an electrophilic substituent such as an isocyanato group or an epoxy group, addition reaction products between an amide and a mono- or multi-functional alcohol, amine or thiol, unsaturated carboxylic acid esters having an eliminatable substituent such as a halogen group or a tosyloxy group, and substitution reaction products between an amide and a mono- or multi-functional alcohol, amine or thiol are also preferred. As other examples, compounds obtained by replacing the above-described unsaturated carboxylic acids by unsaturated phosphonic acids, styrene or vinyl ether can be used as well.

Specific examples of the monomer of ester between an aliphatic polyhydric alcohol compound and an unsaturated carboxylic acid include acrylic acid esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and polyester acrylate oligomer.

As methacrylic acid esters, there are illustrated tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis-[p-(methacryloxyethoxy)phenyl]dimethylmethane.

As itaconic acid esters, there are illustrated ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

As crotonic acid esters, there are illustrated ethylene glycol dicrotonate, tetramethylene glycol dicrotonate, pentaerythritol dicrotonate, and sorbitol tetracrotonate.

As isocrotonic acid esters, there are illustrated ethylene glycol diisocrotonate, pentaerythritol diisocrotonate, and sorbitol tetraisocrotonate.

As maleic acid esters, there are illustrated ethylene glycol dimaleate, triethylene glycol dimaleate, pentaerythritol dimaleate, and sorbitol tetramaleate.

As other examples of esters, there can also be preferably used, for example, aliphatic alcohol-derived esters described in JP-B-46-27926, JP-B-51-47334, and JP-A-57-196231, esters having an aromatic skeleton and described in JP-A-59-5240, JP-A-59-5241, and JP-A-2-226149, and esters having an amino group and described in JP-A-1-165613.

The above-described ester monomers can be used as a mixture thereof.

Specific examples of the monomer of amide between an aliphatic polyamine compound and an unsaturated carboxylic acid include methylenebis-acrylamide, methylenebis-methacrylamide, 1,6-hexamethylenebis-acrylamide, 1,6-hexamethylenebis-methacrylamide, diethylenetriaminetrisacrylamide, xylylenebisacrylamide, and xylylenebismethacrylamide.

As examples of other preferred amide monomers, there can be illustrated those monomers which are described in JP-B-54-21726 and have a cyclohexylene structure.

In addition, urethane series addition polymerizable compounds produced by employing addition reaction between an isocyanate and a hydroxyl group are also preferred, and specific examples thereof include vinylurethane compounds having two or more polymerizable vinyl groups within the molecule, which are described in JP-B-48-41708 and which are obtained by adding a hydroxyl group-containing vinyl monomer represented by the following general formula (V) to a polyisocyanate compound having two or more isocyanato groups within the molecule.

$$CH_2=C(R)COOCH_2CH(R')OH \quad (V)$$

(R and R' each represents H or CH$_3$.)

Further, urethane acrylates as described in JP-A-51-37193, JP-B-2-32293, and JP-B-2-16765 and urethane compounds which are described in JP-B-58-49860, JP-B-56-17654, JP-B-62-39417, and JP-B-62-39418 and which have an ethyleneoxide skeleton are also preferred.

Still further, a cured composition can be obtained in a short time by using addition polymerizable compounds having an amino structure or a sulfide structure within the molecule and described in JP-A-63-277653, JP-A-63-260909, and JP-A-1-105238.

As other examples, there can be illustrated polyester acrylates as described in JP-A-48-64183, JP-B-49-43191, and JP-B-52-30490 and multi-functional acrylates or methacrylates such as epoxyacrylates obtained by reacting an epoxy resin with (meth)acrylic acid. In addition, there can be illustrated particular unsaturated compounds described in JP-B-46-43946 and JP-A-1-40337, and JP-B-1-40336, and vinylphosphonic acid compounds described in JP-A-2-25493. Further, in some cases, a perfluoroalkyl group-containing structure described in JP-A-61-22048 is preferably used. Still further, those which are reported as photo-curable monomers and oligomers in *Journal of the Adhesion Society of Japan*, vol. 20, No. 7, pp. 300-308 (1984) can also be used.

With respect to light-sensitive speed, a structure having many unsaturated groups per molecule is preferred and, in many cases, existence of two or more functional groups per molecule is preferred. Also, in order to enhance mechanical strength of image areas or cured film, existence of three or more functional groups per molecule is preferred. Further, combined use of compounds different from each other in number of functional group and in kind of polymerizable group (e.g., acrylates, methacrylates, styrenic compounds, and vinyl ether compounds) is effective for adjusting both light sensitivity and strength.

The addition amount of the polymerizable compounds including the polymerizable compound of the component (A) is preferably in the range of from 5 to 80% by weight, more preferably from 25 to 75% by weight, based on the weight of the all solid components in the composition. These compounds may be used independently or in combination of two or more thereof.

The composition for use in laser decomposition containing the polymerizable compound can be polymerized and cured by energy such as light or heat before and/or after laser decomposition.

<Initiators>

As initiators, initiators known to those skilled in the art can be used with no limitations. Specifically, many initiators are described in, for example, Bruce M. Monroe, et al., *Chemical Revue*, 93, 435 (1993); R. S. Davidson, *Journal of Photochemistry and Biology A: Chemistry*, 73.81 (1993); J. P. Faussier, *Photoinitiated Polymerization-Theory and Applications*: Rapra Review vol. 9, Report, Rapra Technology (1998); and M. Tsunooka et al., *Prog. Polym. Sci.*, 21, 1 (1996). In addition, compounds which cause oxidative or reductive bond cleavage as described in F. D. Saeva, *Topics in Current Chemistry*, 156, 59 (1990); G. G. Maslak, *Topics in Current Chemistry*, 168, 1 (1993); H. B. Shuster et al., *JACS*, 112, 6329 (1990); and I. D. F. Eaton et al., *JACS*, 102, 3298 (1980) are also known.

Regarding preferred specific examples of the initiators, radical initiators which generate radical by energy of light and/or heat and initiate and accelerate polymerization reaction of the above-mentioned polymerizable compounds will be described hereinafter, but the invention is not limited at all by the description.

In the invention, as preferred radical initiators, there are illustrated (a) aromatic ketones, (b) onium salt compounds, (c) organic peroxides, (d) thio compounds, (e) hexaarylbiimidazole compounds, (f) ketoxime ester compounds, (g) borate compounds, (h) azinium compounds, (i) metallocene compounds, (j) active ester compounds, (k) carbon-halogen bond having compounds, and (l) azo compounds. Specific examples of (a) to (l) will be illustrated below which, however, do not limit the invention in any way.

(a) Aromatic Ketones

As aromatic ketones (a) preferred as radical initiators to be used in the invention, there are illustrated compounds having a benzophenone skeleton or a thioxanthone skeleton, described in J. P. Fouassier & J. F. Rabek, *RADIATION CURING IN POLYMER SCIENCE AND TECHNOLOGY*, pp. 77-117 (1993). For example, there are illustrated the following compounds.

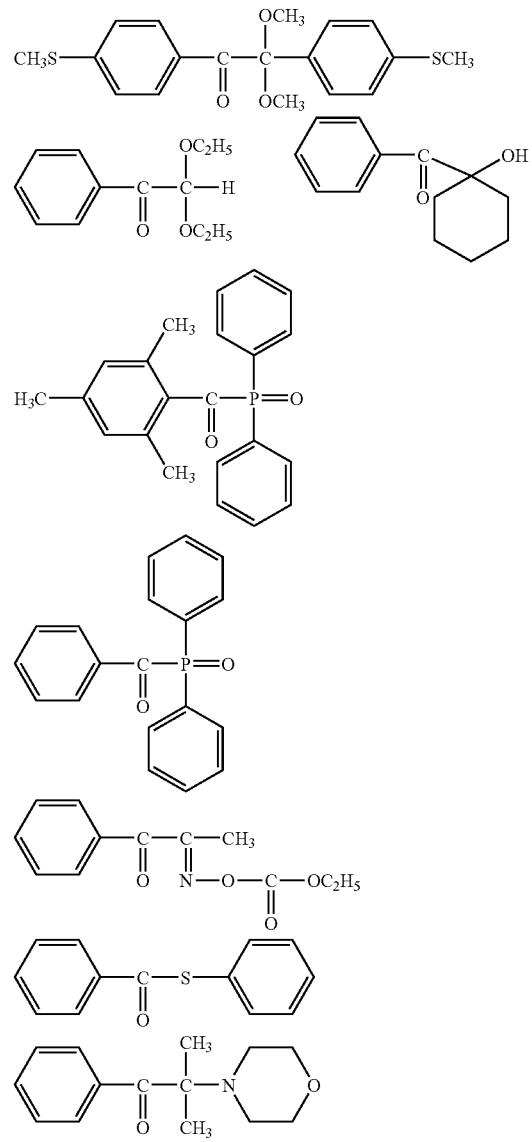

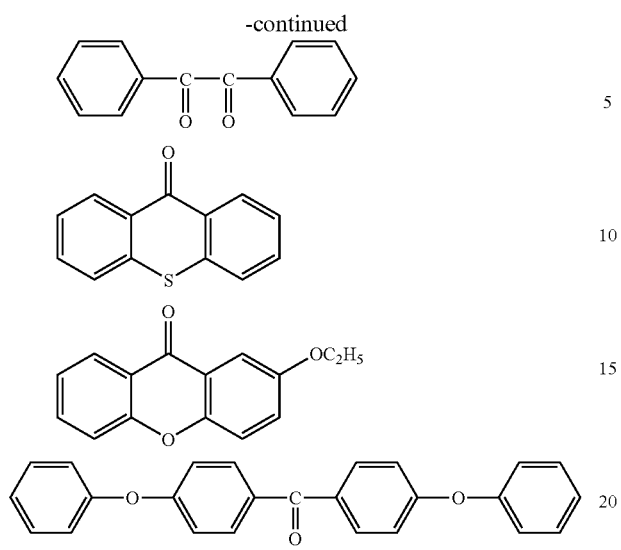

As examples of particularly preferred aromatic ketones (a), there are illustrated, for example, the following compounds.

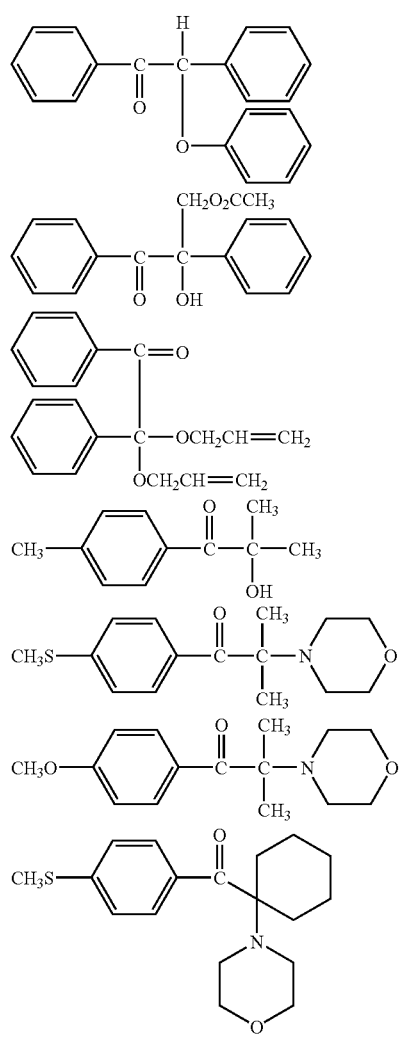

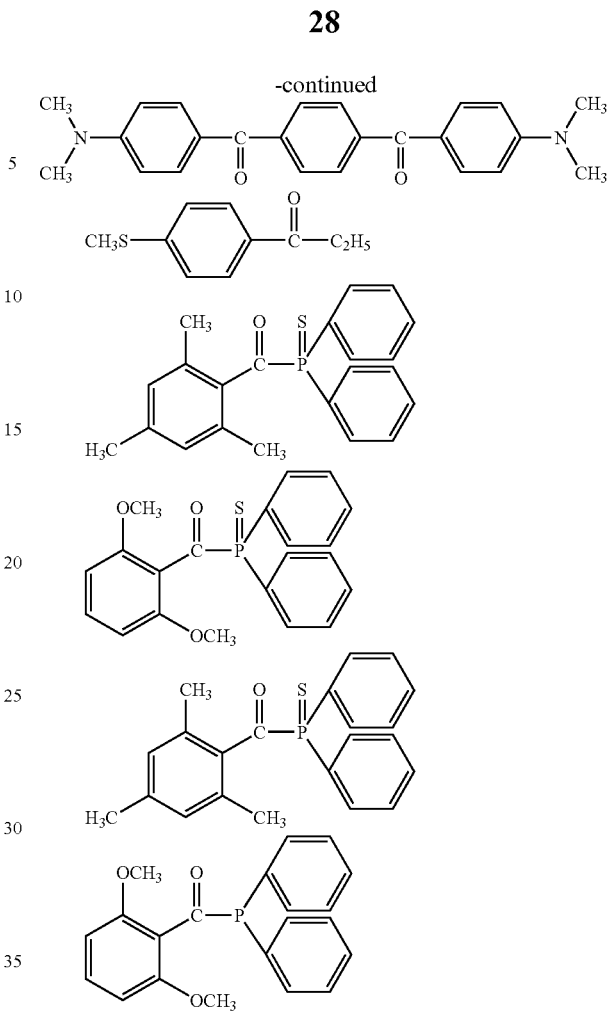

(b) Onium Salt Compounds

As onium salt compounds (b) preferred as radical initiators to be used in the invention, there are illustrated compounds represented by the following general formulae (1) to (3).

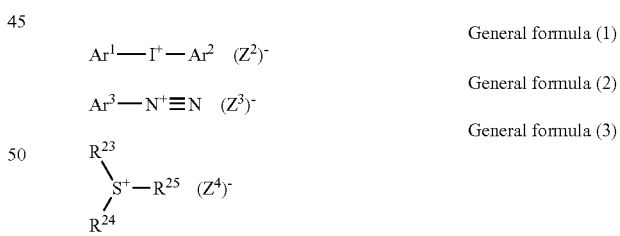

In formula (1), $Ar^1$ and $Ar^2$ each independently represents an aryl group optionally having a substituent and containing 20 or less carbon atoms. $(Z^2)^-$ represents a counter ion selected from the group consisting of a halogen ion, a perchlorate ion, a carboxylate ion, a tetrafluoroborate ion, a hexafluorophosphate ion, and a sulfonate ion, and preferably represents a perchlorate ion, hexafluorophosphate ion or an arylsulfonate ion.

In formula (2), $Ar^3$ represents an aryl group optionally having a substituent and containing 20 or less carbon atoms. $(Z^3)^-$ represents the same counter ion as $(Z^2)^-$.

In formula (3), $R^{23}$, $R^{24}$ and $R^{25}$, which may be the same or different, each represents a hydrocarbon group optionally having a substituent and containing 20 or less carbon atoms. $(Z^4)^-$ represents the same counter ion as $(Z^2)^-$.

As specific examples of the onium salt which can preferably be used in the invention, there can be illustrated those compounds which are described in JP-A-2001-133969 the applicant has formerly proposed, paragraph numbers [0030] to [0033], those described in JP-A-2001-343742, paragraph numbers [0015] to [0046], and particular aromatic sulfonium salt compounds described in JP-A-2002-148790, JP-A-2001-343742, JP-A-2002-6482, JP-A-2002-116539, and JP-A-2004-102031.

(c) Organic Peroxides

Preferred organic peroxides (c) preferred as radical initiators which can be used in the invention include most organic compounds having one or more oxygen-oxygen bond. Examples thereof include methyl ethyl ketone peroxide, cyclohexanone peroxide, 3,3,5-trimethylcyclohexanone peroxide, methylcylohexanone, acetylacetone peroxide, 1,1-bis(t-butylperoxy)-3,3,5-trimethylcyclohexane, 1,1-bis(t-butylperoxy)cyclohexane, 2,2-bis(t-butylperoxy)butane, t-butyl hydroperoxide, cumene hydroperoxide, diisopropylbenzene hydroperoxide, p-methane hydroperoxide, 2,5-dimethylhexane-2,5-dihydroperoxide, 1,1,3,3-tetramethylbutyl hydroperoxide, di-t-butyl peroxide, t-butyl cumylperoxide, dicumyl peroxide, bis(t-butylperoxyisopropyl)benzene, 2,5-dimethyl-2,5-di(t-butylperoxy)hexane, 2,5-xanoyl peroxide, succinic acid peroxide, benzoyl peroxide, 2,4-dichlorobenzoyl peroxide, m-toluoyl peroxide, diisopropylperoxy dicarbonate, di-2-ethylhexylperoxy dicarbonate, di-2-ethoxyethylperoxy dicarbonate, dimethoxyisopropylperoxy carbonate, di(3-methyl-3-methoxybutyl)peroxy dicarbonate, t-butylperoxy acetate, t-butylperoxy pivalate, t-butylperoxy neodecanoate, t-butylperoxy octanoate, t-butylperoxy-3,5,5-trimethylhexanoate, t-butylperoxy laurate, tertiary carbonate, 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, carbonyl-di(t-butylperoxy-dihydrogendiphthalate), and carbonyldi(t-hexylperoxy-dihydrogendiphthalate).

Of these, peroxy esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, and di-t-butyldiperoxy isophthalate are preferred.

(d) Thio Compounds

As thio compounds (d) preferred as radical initiators to be used in the invention, there are illustrated compounds having a structure represented by the following general formula (4).

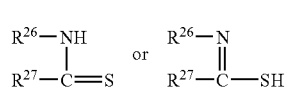

General formula (4)

In the general formula (4), $R^{26}$ represents an alkyl group, an aryl group or a substituted aryl group, $R^{27}$ represents a hydrogen atom or an alkyl group, or $R^{26}$ and $R^{27}$ represent, when connected to each other, non-metallic atoms necessary for forming a 5- to 7-membered ring optionally containing a hetero atom selected from the group consisting of oxygen atom, sulfur atom and nitrogen atom.

As specific examples of the thio compounds represented by the general formula (4), there are illustrated the following compounds.

| No. | $R^{26}$ | $R^{27}$ |
|---|---|---|
| 1 | —H | —H |
| 2 | —H | —CH$_3$ |
| 3 | —CH$_3$ | —H |
| 4 | —CH$_3$ | —CH$_3$ |
| 5 | —C$_6$H$_5$ | —C$_2$H$_5$ |
| 6 | —C$_6$H$_5$ | —C$_4$H$_9$ |
| 7 | —C$_6$H$_4$Cl | —CH$_3$ |
| 8 | —C$_6$H$_4$Cl | —C$_4$H$_9$ |
| 9 | —C$_6$H$_4$—CH$_3$ | —C$_4$H$_9$ |
| 10 | —C$_6$H$_4$—OCH$_3$ | —CH$_3$ |
| 11 | —C$_6$H$_4$—OCH$_3$ | —C$_2$H$_5$ |
| 12 | —C$_6$H$_4$—OC$_2$H$_5$ | —CH$_3$ |
| 13 | —C$_6$H$_4$—OC$_2$H$_5$ | —C$_2$H$_5$ |
| 14 | —C$_6$H$_4$—OCH$_3$ | —C$_4$H$_9$ |
| 15 | —(CH$_2$)$_2$— | |
| 16 | —(CH$_2$)$_2$—S— | |
| 17 | —CH(CH$_3$)—CH$_2$—S— | |
| 18 | —CH$_2$—CH(CH$_3$)—S— | |
| 19 | —C(CH$_3$)$_2$—CH$_2$—S— | |
| 20 | —CH$_2$—C(CH$_3$)$_2$—S— | |
| 21 | —(CH$_2$)$_2$—O— | |
| 22 | —CH(CH$_3$)—CH$_2$—O— | |
| 23 | —C(CH$_3$)$_2$—CH$_2$—O— | |
| 24 | —CH=CH—N(CH$_3$)— | |
| 25 | —(CH$_2$)$_3$—S— | |
| 26 | —(CH$_2$)$_2$—CH(CH$_3$)—S— | |
| 27 | —(CH$_2$)$_3$—O— | |
| 28 | —(CH$_2$)$_5$— | |
| 29 | —C$_6$H$_4$—O— | |
| 30 | —N=C(SCH$_3$)—S— | |
| 31 | —C$_6$H$_4$—NH— | |
| 32 | 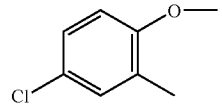 | |

(e) Hexaarylbiimidazole Compounds

As hexaarylbiimidazole compounds (e) preferred as radical initiators to be used in the invention, there are illustrated lophine dimmers described in JP-B-45-37377 and JP-B-44-86516, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluoromethylphenyl)-4,4',5,5'-tetraphenylbiimidazole.

(f) Ketoxime Ester Compounds

As ketooxime ester compounds (f) preferred as radical initiators to be used in the invention, there are illustrated 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

(g) Borate Compounds

As borate compounds (g) preferred as radical initiators to be used in the invention, there are illustrated compounds represented by the following general formula (5).

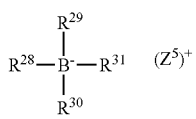

General formula (5)

In the general formula (5), $R^{28}$, $R^{29}$, $R^{30}$, and $R^{31}$, which may be the same or different, each represents a substituted or unsubstituted alkyl group, a substituted or unsubstituted aryl group, a substituted or unsubstituted alkenyl group, a substituted or unsubstituted alkynyl group or a substituted or unsubstituted hetero ring group, or two or more of $R^{28}$, $R^{29}$, $R^{30}$, and $R^{31}$ may be connected to each other to form a ring structure, provided that at least one of $R^{28}$, $R^{29}$, $R^{30}$, and $R^{31}$ is a substituted or unsubstituted alkyl group. $(Z^5)^+$ represents an alkali metal cation or a quaternary ammonium cation.

As examples of the compounds represented by the general formula (5), there are specifically illustrated the compounds represented by U.S. Pat. Nos. 3,567,453 and 4,343,891, and European Patent Nos. 109,772 and 109,773, and the following compounds.

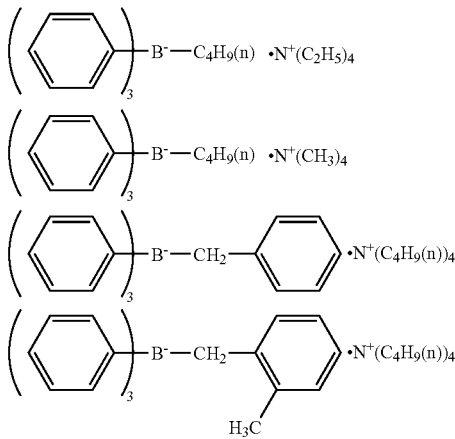

(h) Azinium Compounds

As azinium salt compounds (h) preferred as radical initiators to be used in the invention, there are illustrated N—O bond-containing compounds described in JP-A-63-138345, JP-A-63-142345, JP-A-63-142346, JP-A-63-143537, and JP-B-46-42363.

(i) Metallocene Compounds

As metallocene compounds (i) preferred as radical initiators to be used in the invention, there are illustrated titanocene compounds described in JP-A-59-152396, JP-A-61-151197, JP-A-63-41484, JP-A-2-249, and JP-A-2-4705 and iron-arene complexes described in JP-A-1-304453 and JP-A-1-152109.

Specific examples of the titanocene compound include di-cyclopentadienyl-Ti-dichloride, di-cyclopentadienyl-Ti-bis-phenyl, di-cyclopentadienyl-Ti-bis-2,3,4,5,6-pentafluorophen-1-yl, dicyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-bis-2,4-difluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyr-1-yl)phenyl)titanium bis(cyclopentadienyl)bis[2,6-difluoro-3-(methylsulfonamido)phenyl]titanium, bis(cyclopentadienyl)bis[2,6-difluoro-3-(N-butylbialloyl-amino)phenyl]titanium, bis(cyclopentadienyl)bis[2,6-difluoro-3-(N-butyl-(4-chlorobenzoyl)amino)phenyl]titanium, bis(cyclopentadienyl)bis[2,6-difluoro-3-(N-benzyl-2,2-dimethylpentanoylamino)phenyl]titanium, bis(cyclopentadienyl)bis[2,6-difluoro-3-(N-(2-ethylhexyl)-4-tolyl-sulfonyl)amino]phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cyclopentadienyl)bis[2,6-difluoro-3-(trifluoromethylsulfonyl)amino]phenyl]titanium, bis(cyclopentadienyl)bis[2,6-difluoro-3-(trifluoroacetylamino)phenyl]titanium, bis(cyclopentadienyl)bis[2,6-difluoro-3-(2-chlorobenzoyl)amino]phenyl]titanium, bis(cyclopentadienyl)bis[2,6-difluoro-3-(4-chlorobenzoyl)amino]phenyl]titanium, bis(cyclopentadienyl)bis[2,6-difluoro-3-(N-3,6-dioxadecyl)-2,2-dimethylpentanoylamino]phenyl]titanium, bis(cyclopentadienyl)bis[2,6-difluoro-3-(N-3,7-dimethyl-7-methoxyoctyl)benzoylamino)]phenyl]titanium, and bis(cyclopentadienyl)bis[2,6-difluoro-3-(N-cyclohexylbenzoylamino)phenyl]titanium.

(j) Active Ester Compounds

As active ester compounds (j) preferred as radical initiators to be used in the invention, there are illustrated imidosulfonate compounds described in JP-B-62-6223 and active sulfonates described in JP-B-63-14340 and JP-A-59-174831.

(k) Carbon-Halogen Bond Having Compounds

As carbon-halogen bond having compounds (k) preferred as radical initiators to be used in the invention, there are illustrated those represented by the following general formulae (6) to (12).

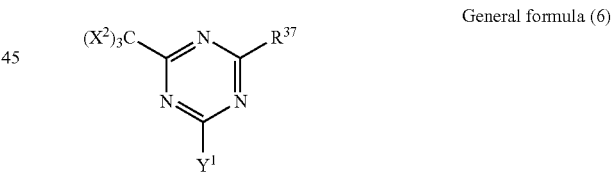

General formula (6)

In the general formula (6), $X^2$ represents a halogen atom, $Y^1$ represents —$C(X^2)_3$, —$NH_2$, —$NHR^{38}$, —$NR^{38}$ or —$OR^{38}$ (wherein $R^{38}$ represents an alkyl group, a substituted alkyl group, an aryl group or a substituted aryl group), and $R^{37}$ represents —$C(X^2)_3$, an alkyl group, a substituted alkyl group, an aryl group, a substituted aryl group or a substituted alkenyl group.

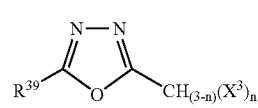

General formula (7)

In the general formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, $X^3$ represents a halogen atom, and n represents an integer of from 1 to 3.

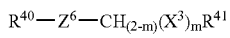

General formula (8)

In the general formula (8), $R^{40}$ represents an aryl group or a substituted aryl group, $R^{41}$ represents a group shown below or a halogen atom, $Z^6$ represents —C(=O)—, —C(=S)— or —SO$_2$—, $X^3$ represents a halogen atom, and m represents 1 or 2.

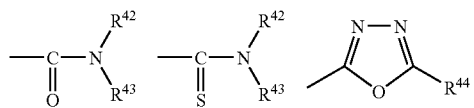

In the above formulae, $R^{42}$ and $R^{43}$ each represents an alkyl group, a substituted alkyl group, an alkenyl group, a substituted alkenyl group, an aryl group or a substituted aryl group, and $R^{44}$ is the same as $R^{38}$ in the general formula (6).

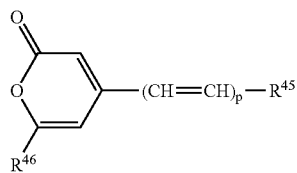

General formula (9)

In the general formula (9), $R^{45}$ represents an optionally substituted aryl group or hetero ring group, $R^{46}$ represents a trihaloalkyl group or trihaloalkenyl group having from 1 to 3 carbon atoms, and p represents 1, 2 or 3.

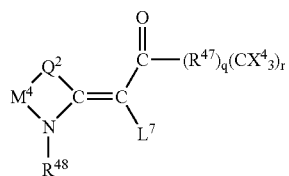

General formula (10)

Formula (10) represents a carbonylmethylene-hetero ring compound having a trihalogenomethyl group. In formula (10), $L^7$ represents a substituent of the formula of CO—$(R^{47})_q$—$(C(X^4)_3)_r$, $Q^2$ represents a sulfur atom, a selenium atom or an oxygen atom, a dialkylmethylene group, an alken-1,2-ylene group, a 1,2-phenylene group or N—R group, $M^4$ represents a substituted or unsubstituted alkylene group or alkenylene group, or a 1,2-arylene group, $R^{48}$ represents an alkyl group, an aralkyl group or an alkoxyalkyl group, $R^{47}$ represents a divalent carbonyclic or heterocyclic aromatic group, $X^4$ represents a chlorine atom, a bromine atom or an iodine atom, and q=0 and r=1, or q=1 and r=1, or 2.

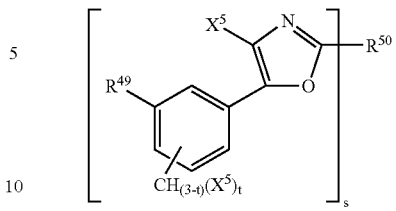

General formula (11)

Formula (11) represents a 4-halogeno-5-(halogenomethylphenyl)oxazole derivative. In formula (11), $X^5$ represents a halogen atom, t represents an integer of from 1 to 3, s represents an integer of from 1 to 4, $R^{49}$ represents a hydrogen atom or $CH_{3-t}X^5_t$, and $R^{50}$ represents an s-valent, optionally substituted unsaturated organic group.

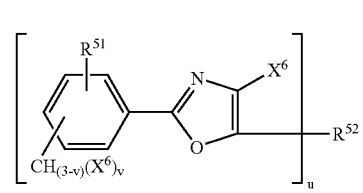

General formula (12)

Formula (12) represents a 2-(halogenomethylphenyl)-4-halogenooxazole derivative. In formula (12), $X^6$ represents a halogen atom, v represents an integer of from 1 to 3, u represwents an integer of from 1 to 4, $R^{51}$ represents a hydrogen atom or $CH_{3-v}X^6_v$, and $R^{52}$ represents a u-valent, optionally substituted unsaturated organic group.

As specific examples of the carbon-halogen bond having compounds, there are illustrated, for example, compounds described in Wakabayashi et al., Bull. Chem. Soc. Japan, 42, 2924 (1969), such as 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine, and 2-(α,α,β-trichloroethyl)-4,6-bis(trichloromethyl)-S-triazine. Besides, there are illustrated compounds described in British Patent No. 1,388,492, such as 2-styryl-4,6-bis(trichloromethyl)-S-triazine, 2-(p-methylstyryl)-4,6-bis(trichloromethyl)-S-triazine, 2-(p-methoxystyryl)-4,6-bis(trichloromethyl)-S-triazine, and 2-(p-methoxystyryl)-4-amino-6-trichloromethyl-S-triazine; compounds described in JP-A-53-133428, such as 2-(4-methoxy-naphth-1-yl)-4,6-bis-trichloromethyl-S-triazine, 2-(4-ethoxy-naphth-1-yl)-4,6-bis-trichloromethyl-S-triazine, 2-[4-(2-ethoxyethyl)-naphth-1-yl]-4,6-bis-trichloromethyl-S-triazine, 2-(4,7-dimethoxy-naphth-1-yl)-4,6-bis-trichloromethyl-S-triazine, and 2-(acenaphth-5-yl)-4,6-bis-trichloromethyl-S-triazine; and compounds described in German Patent No. 3,337,024, such as the following compounds. Further, there can be illustrated the following compounds which can be readily synthesized by those skilled in the art according to the synthesis process described in M. P. Hutt, E. F. Elslager and L. M. Herbel; *Journal of Heterocyclic Chemistry*, vol. 7 (No. 3), p. 511 et seq (1970). Examples thereof are illustrated below.

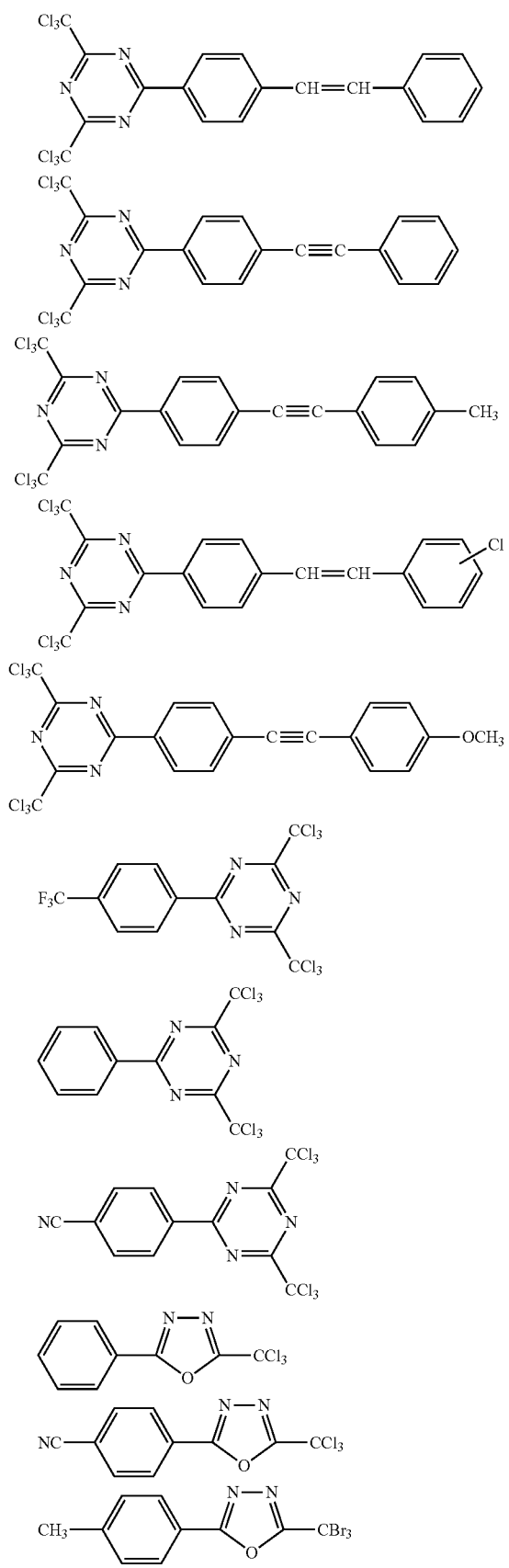

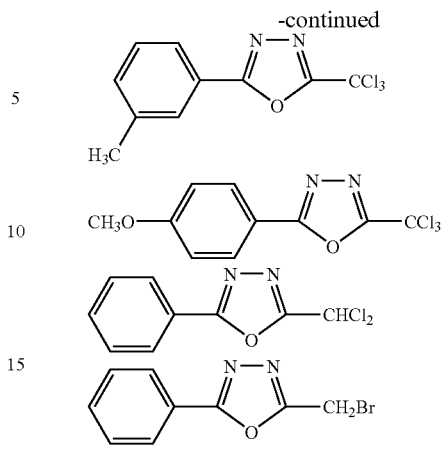

(l) Azo Compounds

As azo compounds (l) preferred as radical initiators to be used in the invention, there are illustrated 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamidoxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide], and 2,2'-azobis(2,4,4-trimethylpentane).

As more preferred examples of the radical initiators in the invention, there can be illustrated the above-described aromatic ketones (a), onium salt compounds (b), organic peroxides (c), hexaarylbiimidazole compounds (e), metallocene compounds (i), and carbon-halogen bond having compounds (k) and, as the most preferred examples, there can be illustrated aromatic iodonium salts, aromatic sulfonium salts, titanocene compounds, and trihalomethyl-S-triazine compounds represented by the general formula (6).

The initiator can be added in a content of generally from 0.1 to 50% by weight, preferably from 0.5 to 30% by weight, particularly preferably from 5 to 20% by weight, based on the weight of the all solid components of the composition.

The initiators in the invention are preferably used independently or in combination thereof.

Other Components

To the composition of the invention can be properly added other components adapted for the use and the production process. Hereinafter, preferred additives will be illustrated.

<Sensitizing Dyes>

In the invention, when a laser emitting infrared rays of from 760 to 1,200 nm (YAG laser, semiconductor laser, etc.) is used as a light source, an infrared ray absorbent is used. The infrared ray absorbent absorbs the laser light to generate heat, thus promoting thermal decomposition. Infrared ray absorbents to be used in the invention are dyes or pigments having an absorption maximum in the wavelength region of from 760 nm to 1,200 nm.

As such dyes, known ones described in literatures such as *Senryo Binran* (compiled by Yuki Gosei Kagaku Kyokai and published in 1960) can be utilized. Specifically, there are illustrated azo dyes, metal complex salt azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salt dyes, and metal thiolate complexes.

As preferred dyes, there can be illustrated cyanine dyes described in JP-A-58-125246, JP-A-59-84356, JP-A-59-202829, and JP-A-60-78787, methine dyes described in JP-A-58-173696, JP-A-58-181690, and JP-A-58-194595, naphthoquinone dyes described in JP-A-58-112793, JP-A-58-224793, JP-A-59-48187, JP-A-59-73996, JP-A-60-52940, and JP-A-60-63744, squarylium dyes described in JP-A-58-112792, and cyanine dyes described in British Patent No. 434,875.

In addition, near-infrared ray-absorbing sensitizers described in U.S. Pat. No. 5,156,938 are also preferably used. Further, substituted arylbenzo(thio)pyrylium salts described in U.S. Pat. No. 3,881,924, trimethinethiapyrylium salts described in JP-A-57-142645 (U.S. Pat. No. 4,327,169), pyrylium compounds described in JP-A-58-181051, JP-A-58-220143, JP-A-59-41363, JP-A-59-84248, JP-A-59-84249, JP-A-59-146063, and JP-A-59-146061, cyanine dyes described in JP-A-59-216146, pentamethinethiopyrylium salts described in U.S. Pat. No. 4,283,475, and pyrylium compounds disclosed in JP-B-5-13514 and JP-B-5-19702 are also preferably used. As other preferred dye examples, there can be illustrated near-infrared ray-absorbing dyes described in U.S. Pat. No. 4,756,993 as formulae (I) and (II).

Further, as other preferred examples of the infrared ray-absorbing dyes of the invention, there are illustrated particular indoleninecyanine dyes described in JP-A-2002-27805.

Of these dyes, particularly preferred dyes are cyanine dyes, squarylium dyes, pyrylium salt dyes, nickel thiolate complexes, and indoleninecyanine dyes, with cyanine dyes and indoleninecyanine dyes being more preferred.

As specific examples of cyanine dyes which can preferably be used in the invention, there are illustrated those dyes described in JP-A-2001-133969, paragraph numbers [0017] to [0019], JP-A-2002-40638, paragraph numbers [0012] to [0038], JP-A-2002-23360, and paragraph numbers [0012] to [0023].

Dyes represented by the following general formula (d) or (e) are preferred from the standpoint of light-heat converting properties.

General formula (d)

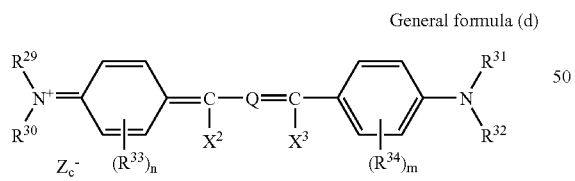

In the general formula (d), $R^{29}$ to $R^{31}$ each independently represents a hydrogen atom, an alkyl group or an aryl group, $R^{33}$ and $R^{34}$ each independently represents an alkyl group, a substituted oxy group or a halogen atom, m and n each independently represents an integer of from 0 to 4, and $R^{29}$ and $R^{30}$, or $R^{31}$ and $R^{32}$, may be connected to each other to form a ring and, further, $R^{29}$ and/or $R^{30}$ may be connected to $R^{33}$, and $R^{31}$ and/or $R^{32}$ may be connected to $R^{34}$, to form a ring and, still further, when plural $R^{33}$s or $R^{34}$s exist, $R^{33}$s or $R^{34}$s may be connected to each other to form a ring. $X^2$ and $X^3$ each independently represents a hydrogen atom, an alkyl group or an aryl group, with at least one of $X^2$ and $X^3$ representing a hydrogen atom or an alkyl group. Q represents an optionally substituted trimethine group or pentamethine group, and may form a ring structure together with a divalent organic group. $Zc^-$ represents a counter anion provided that, when the dye represented by the general formula (d) has an anionic substituent within its structure and neutralization of charge is not necessary, $Zc^-$ is not necessary. In view of storage stability of the coating solution, preferred $Zc^-$ is a halogen ion, a perchlorate ion, a tetrafluoroborate ion, a hexafluorophosphate ion or a sulfonate ion, with a perchlorate ion, a hexafluorophosphate ion or an arylsulfonate ion being particularly preferred.

As specific examples of the dyes which are represented by the general formula (d) and which can preferably be used in the invention, there are illustrated the following ones.

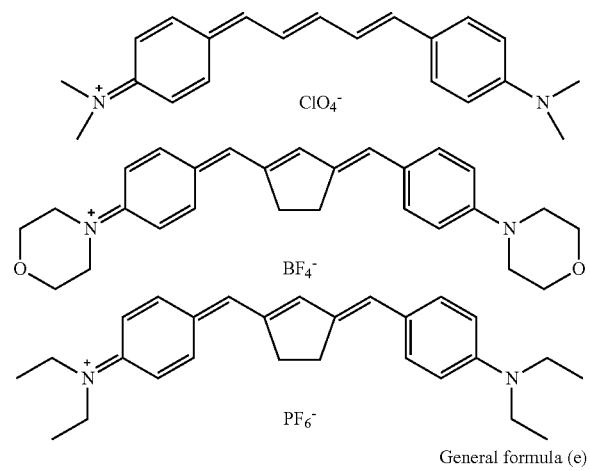

General formula (e)

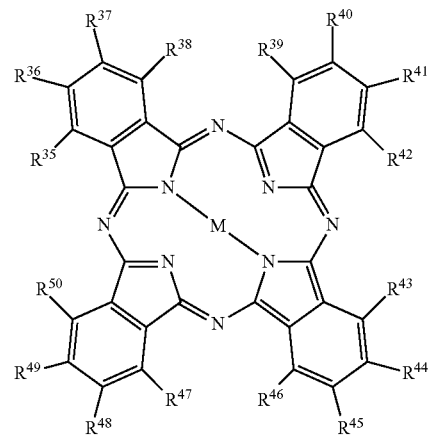

In the general formula (e), $R^{35}$ to $R^{50}$ each independently represents a hydrogen atom, a halogen atom, a cyano group, an alkyl group, an aryl group, an alkenyl group, an alkynyl group, a hydroxyl group, a carbonyl group, a thio group, a sulfonyl group, a sulfinyl group, an oxyl group, an amino group or an onium salt structure and, when a substituent can be introduced into these groups, they may have the substituent. M represents two hydrogen atoms, or a metal atom, a halometal group or an oxymetal group and, as the metal atoms contained therein, there are illustrated atoms of Groups IA, IIA, IIIB and IVB of the periodic table, transition metals of the first, second and third periods in the periodic table, and lanthanoid elements, with copper, magnesium, iron, zinc, cobalt, aluminum, titanium and vanadium being preferred.

As specific examples of the dyes which are represented by the general formula (e) and which can preferably be used in the invention, there are illustrated the following ones.

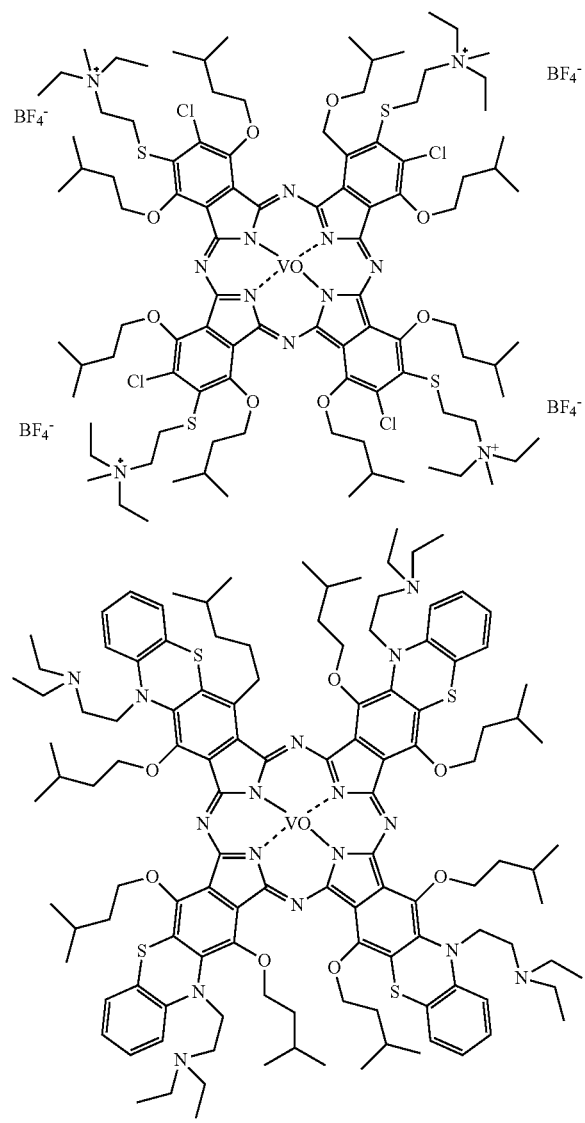

As pigments to be used in the invention, commercially available dyes and those dyes which are described in *Color Index Handbook* (C.I.), *Saishin Ganryo Binran* (Newest Pigment Handbook) (edited by Society of Pigment Technologies, Japan, 1977), *Saishin Ganryo Ouyou Gijutsu* (Newest Pigment Application Technologies) (published by CMC Press, 1986), and *Insatsu Ink Gijutsu* (Printing Ink Technologies) (Published by CMC Press, 1984) can be utilized.

Examples of the pigments include a black pigment, a yellow pigment, an orange pigment, a brown pigment, a red pigment, a violet pigment, a blue pigment, a green pigment, a fluorescent pigment, a metallic powder pigment, and a polymer bound dye. Specific examples thereof to be used include an insoluble azo pigment, an azo lake pigment, a condensed azo pigment, a chelate azo pigment, a phthalocyanine pigment, an anthraquinone pigment, perylene and perynone pigments, a thioindigo pigment, a quinacridone pigment, a dioxazine pigment, an isoindolinone pigment, a quinophthalone pigment, a dyeing lake pigment, an azine pigment, a nitroso pigment, a nitro pigment, a natural pigment, a fluorescent pigment, an inorganic pigment, and carbon black. Of these pigments, carbon black is preferred.

These pigments may be used without being subjected to surface treatment or may be used after being subjected to surface treatment. As methods for the surface treatment, there are considered a method of coating the surface with a resin or wax, a method of depositing a surfactant, and a method of binding a reactive substance (e.g., a silane coupling agent, an epoxy compound or a polyisocyanate) to the pigment surface. These surface-treating methods are described in *Kinzoku Sekken no Seishitsu to Ouyou* (Nature and Applications of Metallic Soap) (published by Saiwai Shobo, Inc.), *Insatsu Ink Gijutsu* (Printing Ink Technologies) (published by CMC Press, 1984), and *Saishin Ganryo Ouyou Gijutsu* (Newest Pigment Application Technologies) (published by CMC Press, 1986).

The particle size of the pigment is in the range of preferably from 0.01 μm to 10 μm, more preferably from 0.05 μm to 1 μm, particularly preferably from 0.1 μm to 1 μm. When the particle size of the pigment is 0.01 μm or larger, stability of the dispersion in the coating solution is increased and, when 10 μm or smaller, there results a good uniformity of the composition layer.

As methods for dispersing the pigment, known dispersing techniques used for producing an ink or a toner can be used. As dispersing machines, there are illustrated an ultrasonic wave dispersing apparatus, a sand mill, an attritor, a pearl mill, a super mill, a ball mill, an impeller, a disperser, a KD mill, a colloid mill, a dynatron, a three-roll mill, and a pressure kneader. Detailed descriptions thereof are given in *Saishin Ganryo Ouyou Gijutsu* (Newest Pigment Application Technologies) (published by CMC Press, 1986).

<Co-Sensitizers>

Use of a certain kind of additive (hereinafter referred to as "co-sensitizer") serves to more improve sensitivity of the composition layer upon photo curing thereof. Mechanism of the improvement is not clear but, in many cases, may be supposedly based on the following chemical process. That is, various intermediate active species (radicals, cations) generated in the course of the photo reaction initiated with the photo polymerization initiator and the subsequent addition polymerization reaction are supposed to react with the co-sensitizer to generate a new active radical. The co-sensitizers are roughly grouped into: (a) those which can be reduced to generate an active radical; (b) those which can be oxidized to generate an active radical; and (c) those which react with a radical having a low activity to form a radical having a higher activity, or which function as chain transfer agents. With respect to individual compounds, however, there are in many cases no commonly accepted theories about which compounds belong to which groups.

(a) Compounds Which can be Reduced to Generate an Active Radical

Compounds Having a Carbon-Halogen Bond:

It is surmised that carbon-to-halogen bond is reductively cleaved to generate an active radical. Specifically, for example, trihalomethyl-s-triazines and trihalomethyloxadiazoles can preferably be used.

Compounds Having a Nitrogen-Nitrogen Bond:

It is surmised that nitrogen-nitrogen bond is reductively cleaved to generate an active radical. Specifically, hexaarylbiimidazoles are preferably used.

Compounds Having an Oxygen-Oxygen Bond:

It is surmised that oxygen-oxygen bond is reductively cleaved to generate an active radical. Specifically, for example, organic peroxides are preferably used.

Onium Compounds:

It is surmised that carbon-hetero atom bond or oxygen-nitrogen bond is reductively cleaved to generate an active radical. Specifically, for example, diaryliodonium salts, triarylsulfonium salts, N-alkoxypyridinium (azinium) salts are preferably used.

Ferrocene, Iron-Arene Complexes:

These compounds can redeuctively generate an active radical.

(b) Compounds which can be Oxidized to Generate an Active Radical

Alkylate Complexes:

It is surmised that carbon-hetero atom bond is oxidatively cleaved to generate an active radical. Specifically, for example, triarylalkyl borates are preferably used.

Alkylamine Compounds:

It is surmised that C—X bond on the carbon atom adjacent to nitrogen atom is oxidatively cleaved to generate an active radical. As X, a hydrogen atom, a carboxyl group, a trimethylsilyl group or a benzyl group is preferred. Specifically, for example, ethanolamines, N-phenylglycines, and N-trimethylsilylmethylanilines are illustrated.

Sulfur- or Tin-Containing Compounds:

The above-described amine compounds wherein nitrogen atom is replaced by sulfur atom or tin atom can generate an active radical based on the same mechanism. In addition, compounds having an S—S bond are also known to show sensitization based on S—S cleavage.

α-Substituted Methylcarbonyl Compounds:

These compounds can generate an active radical by oxidative cleavage of carbonyl-α-carbon bond. In addition, compounds formed by replacing the carbonyl by an oxime ether exhibit the same action. Specifically, there can be illustrated 2-alkyl-1-[4-(alkylthio)phenyl]-2-morpholinopronones and oxime ethers obtained by reacting the pronones with a hydroxylamine and etherifying N—OH.

Sulfinates:

These compounds can reductively generate an active radical. Specifically, there can be illustrated sodium arylsulfinates.

(c) Compounds Capable of Being Converted to a Highly Active Radical by Reaction with a Radical or Compounds which Act as Chain Transfer Agents:

For example, compounds having SH, PH, SiH or GeH within the molecule are used. These compounds can impart hydrogen to a low-activity radical species to generate a radical or can undergo oxidation and subsequent deprotonation to generate a radical. Specifically, there are illustrated, for example, 2-mercaptobenzothiazoles, 2-mercaptobenzoxazoles, and 2-mercaptobenzimidazoles.

Many of more specific examples of the co-sensitizers are described in, for example, JP-A-9-236913 as additives intended to improve sensitivity, and can also be employable in the invention. They are partly illustrated below which, however, do not limit the invention at all. Additionally, in the following formulae, -TMS represents a trimethylsilyl group.

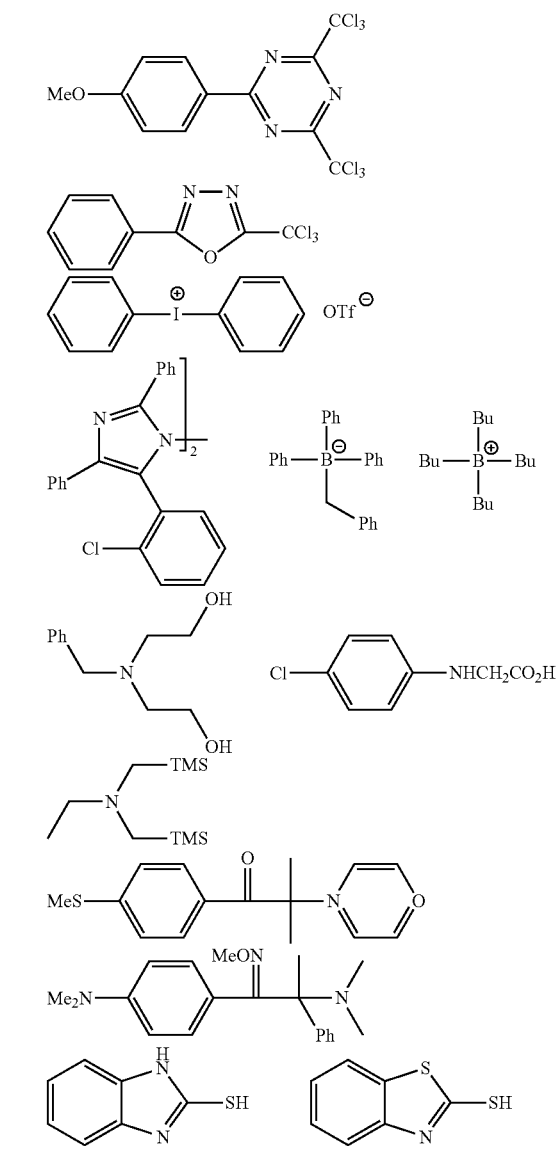

As with the former sensitizing dyes above, these co-sensitizers can also be chemically modified in various ways in order to more improve the characteristics of the composition layer. For example, the co-sensitizers can be modified by utilizing a method of bonding them to sensitizing dyes, initiator compounds, addition-polymerizable unsaturated compounds or other parts, a method of introducing a hydrophilic moiety, a method of improving compatibility, a method of introducing a substituent for inhibition of crystal precipitation, a method of introducing a substituent for improving adhesion properties, or a method of polymerizing them.

The co-sensitizers can be used independently or in combination of two or more thereof. The amount thereof to be used is suitably in the range of from 0.05 to 100 parts by weight, preferably from 1 to 80 parts by weight, more preferably from 3 to 50 parts by weight, per 100 parts by weight of the compound having an ethylenically unsaturated double bond.

<Polymerization Inhibitors>

In the invention, it is desirable to add, in addition to the above-described components, a small amount of a thermal polymerization-preventing agent in order to inhibit unnecessary thermal polymerization of the compound having an ethylenically unsaturated double bond during production or storage of the composition. As adequate thermal polymerization inhibitors, there are illustrated hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and cerous N-nitrosophenylhydroxyamine. Polymerization inhibitor is preferably from about 0.01% by weight to about 5% by weight based on the weight of the whole composition. In addition, as needed, higher fatty acid derivatives such as behenic acid and behenic acid amide may be added and, in the course of drying the composition coated on a support, allow them to exist on the surface of the composition layer for the purpose of preventing oxygen from inhibiting polymerization. The addition amount of the higher fatty acid derivative is preferably from about 0.5% by weight to about 10% by weight based on the weight of the whole composition.

<Colorants>

Further, colorants such as dyes or pigments may be added for the purpose of coloring the composition layer. They can improve visual recognition of image areas and properties such as adaptability to an image density-measuring apparatus. As colorants, pigments are particularly preferred to use. Specific examples thereof include pigments such as phthalocyanine pigments, azo pigments, carbon black, and titanium oxide, and dyes such as Ethyl Violet, Crystal Violet, azo dyes, anthraquinone dyes, and cyanine dyes. The addition amount of the colorant is preferably from about 0.5% by weight to about 5% by weight based on the weight of the whole composition.

<Other Additives>

Further, in order to improve physical properties of cured film, known additives such as fillers and plasticizers may be added to the composition.

The filler may be any of organic compounds, inorganic compounds and mixtures thereof. For example, as the organic compounds, there are illustrated carbon black, carbon nanotube, fullerene, and graphite. As the inorganic compounds, there are illustrated silica, alumina, aluminum and calcium carbonate.

As the plasticizers, there are illustrated, for example, dioctyl phthalate, didodecyl phthalate, triethylene glycol dicaprylate, dimethyl glycol phthalate, tricresyl phosphate, dioctyl adipate, dibutyl sebacate, and triacetyl glycerin and, in the case where a binder is used, they can be added in an amount of 10% by weight or less based on the total weight of the compound having an ethylenically unsaturated double bond and the binder.

<Pattern-Forming Materials>

The pattern-forming material of the invention is characterized in having on a support a layer comprising a composition for use in laser decomposition in accordance with the invention. The layer comprising the composition for use in laser decomposition (hereinafter also referred to as "pattern-forming layer") contains at least the component (A) and the component (B), and the pattern-forming layer may further contain, as needed, the above-described polymerizable compound, initiators and other components. The pattern-forming layer may be a layer formed by previously curing the composition for use in laser decomposition prior to laser decomposition.

Here, the pattern-forming material means a pattern-forming material in which exposed areas form depressions in comparison with non-exposed areas due to laser light exposure to thereby form an uneven pattern. Therefore, it includes not only pattern-forming materials of the type wherein depressions are directly (for example, by ablation) formed by exposure to laser light but also pattern-forming materials wherein depressions are formed by subjecting it, after exposure to laser light, to heat treatment or development processing in an alkaline aqueous solution. The pattern-forming material of the invention can preferably be used particularly as the former type pattern-forming material.

The pattern-forming material to be preferably used in the invention is not particularly limited as to use thereof and can widely be utilized as a precursor of a printing plate such as a lithographic printing plate, a gravure printing plate, a relief printing plate or a screen printing plate, a substrate for printed wiring board, a photo resist material for a semiconductor, and a recording material for an optical disk. In the invention, the pattern-forming material is particularly preferably used for making a printing plate by direct engraving using a laser, so-called "laser engraving". In particular, it is preferably used for making a flexographic printing plate. Thus, the pattern-forming material of the invention is most preferably used as a precursor for making a flexographic printing plate by laser engraving.

(Support)

In the invention, materials having flexibility and excellent dimensional stability are preferably used as a support in the pattern-forming material. For example, there can be illustrated a polyethylene terephthalate film, a polyethylene naphthalate film, a polybutylene terephthalate film and a polycarbonate film. The thickness of the support is preferably from 50 to 350 μm, more preferably from 100 to 250 μm, in view of mechanical characteristics, shape stability or handling properties of the pattern-forming material. In addition, as needed, in order to improve adhesion between the support and the pattern-forming layer, a known adhesive agent layer conventionally used for such purposes may be provided on the surface of the support.

Further, the adhesion properties of the support to be used in the invention to the pattern-forming layer or to the adhesive agent layer can be improved by subjecting the support surface to physical or chemical treatment. As the method for the physical treatment, there can be illustrated a sand blasting method, a wet blasting method of jetting a liquid containing fine particles, a method of corona discharge treatment, a method of treating with plasma, and a method of irradiating with UV rays in the presence or absence of air. Also, as the method for the chemical treatment, there can be illustrated a method of treating with a strong acid, a method of treating with a strong alkali, a method of treating with an oxidizing agent, and a method of treating with a coupling agent.

(Formation of a Film)

In order to mold the decomposable composition of the invention into a sheet-like, roll-like or cylinder-like form, conventional resin-molding methods can be employed. For example, there can be illustrated a mold-casting method, a method of extruding the composition through a nozzle or die by means of a pump or a machine such as an extruder and adjusting the thickness by means of a blade, and a method of adjusting the thickness by calendar processing by means of rolls. Upon such procedure, it is also possible to perform molding under heating within the range of not deteriorating performance of the composition. In addition, as needed, milling treatment or abrasion treatment may be performed. In many cases, the composition is molded on an underlay called a back film comprising a material such as PET or nickel.

Further, it is also possible to use a cylindrical substrate made of fiber-reinforced plastic (FRP), plastic or metal.

As the cylindrical substrate, that which is hollow with a definite thickness can be used for reducing the weight of the substrate. The role of the back film or the cylindrical substrate is to ensure dimensional stability of the pattern-forming material. Therefore, materials having a high dimensional stability must be selected. As specific examples of such materials, there can be illustrated a polyester resin, a polyimide resin, a polyamide resin, a polyamide-imide resin, a polyether-imide resin, a polybismaleimide resin, a polysulfone resin, a polycarbonate resin, a polyphenylene ether resin, a polyphenylene thioether resin, a polyether sulfone resin, a liquid crystal resin comprising an all-aromatic polyester resin, an all-aromatic polyamide resin, and an epoxy resin. In addition, these resins may be laminated to use. For example, a laminate sheet comprising a 4.5-μm thick all-aromatic polyamide film having laminated on each side thereof a 50-μm thick polyethylene terephthalate film may be used. Further, a porous sheet, e.g., a cloth formed by weaving fibers, a non-woven fabric or a film wherein fine pores are formed can be used as the back film. In the case where the porous sheet is used as the back film, the light-sensitive resin cured product layer and the back film can be unified by performing photo curing after the light-sensitive composition impregnates into the pores, thus high adhesion properties being obtained. As fibers for forming the cloth or non-woven fabric, there can be illustrated inorganic fibers such as glass fibers, alumina fibers, carbon fibers, alumina-silica fibers, boron fibers, high-silicon fibers, potassium titanate fibers, and sapphire fibers, natural fibers such as cotton and hemp, semi-synthetic fibers such as rayon and acetate, and synthetic fibers such as nylon, polyester, acryl, vinylon, polyvinyl chloride, polyolefin, polyurethane, polyimide, and aramide. In addition, cellulose produced by bacteria is highly crystalline nano-fibers and is a material for forming thin non-woven fabric with a high dimensional stability.

From the standpoint of improving strength of a film to be formed, the composition of the invention for use in laser decomposition is preferably cured by cross-linking (polymerization) prior to decomposition by laser light. In order to cure the composition, it is preferred to incorporate the polymerizable compound as described hereinbefore in the composition. This technique is generally employed in the field of negative-working (polymerization type) light-sensitive materials as a technique for enhancing strength of the film, and the same effects can supposedly be obtained in the invention as well. This technique is particularly effective when the pattern-forming material is a laser-engravable flexographic printing plate precursor. Curing prior to laser engraving provides the advantages that a relief formed after laser engraving becomes sharp and that adhesiveness of engraving waste produced upon laser engraving is suppressed.

As a method for curing the composition, any method that can cause polymerization reaction of the polymerizable compound in the composition, such as a method of heating the composition, a method of irradiating with light or a method of adding a photo polymerization initiator or a thermal polymerization initiator to the composition and light-irradiating or heating the composition, can be used with no particular limitations.

Among them, a method of heating the composition is preferred as the curing method in view of convenience of works. For the heating of the composition before laser decomposition to cause cross-linking (polymerization) in the composition, any heating means such as an oven, a thermal head, a heating roll, and a laser light can be applied. In the case where temperature control is necessary, temperature can be controlled by controlling the temperature of the oven, thermal head or heating roll or by adjusting intensity or spot diameter of the laser light. The heating temperature is preferably from 40 to 250° C., more preferably from 60 to 220° C., furthermore preferably from 80 to 200° C., in view of thermal stability of co-existing organic compounds. The heating time is preferably from 1 to 120 minutes, more preferably from 5 to 60 minutes, in the point that side reactions (e.g., thermal decomposition of additives) other than curing do not occur.

The thickness of the pattern-forming layer is generally from 0.0005 to 10 mm, preferably from 0.005 to 7 mm.

In the case of using for laser engraving, the thickness may arbitrarily be selected according to the purpose of use and is in the range of preferably from 0.05 to 10 mm, more preferably from 0.1 to 7 mm.

In some cases, plural layers different from each other in formulation may be laminated one over the other. As to a combination of plural layers, it is possible to form, for example, as the outermost layer, a layer which can be engraved by using a laser having an oscillation wavelength in the near-infrared region such as a YAG layer, a fiber laser or a semi-conductor laser and, under this layer, a layer which can be laser-engraved by using an infrared ray laser such as a carbonic acid gas laser or a visible-ultraviolet laser. In the case of laser-engraving according to such method, it is possible to engrave using different laser-engraving apparatuses respectively carrying an infrared laser and a near-infrared laser. It is also possible to engrave using a laser-engraving apparatus carrying both an infrared laser and a near-infrared laser.

In the case where the pattern-forming layer comprises plural layers, the thickness of the pattern-forming layer (sum of the thickness of the lower layer and that of the upper layer) is generally from 0.0005 to 10 mm, preferably from 0.005 to 7 mm.

The upper layer/lower layer thickness ratio in the above-described film thickness is preferably from 30/70 to 95/5, more preferably from 50/50 to 95/5, particularly preferably from 70/30 to 90/10, from the standpoint of forming a pattern with ease (with high sensitivity).

Regarding formation of the pattern-forming layer of the invention, in the case of laminating plural layers, a method of once dissolving components of individual layers in a solvent and, after coating the lower layer on a support and drying the coated layer, coating thereon the upper layer and drying the coated layer, and a method of kneading components of individual layers in a kneader, and then successively casting them on a support.

In the invention, a cushion layer comprising a resin having cushioning properties or a rubber can be formed between the support and the pattern-forming layer or between the pattern-forming layer and the adhesive layer. In the case of forming the cushion layer between the support and the pattern-forming layer, a method of sticking a cushion layer having an adhesive agent layer on one side thereof onto the support with facing the adhesive agent layer side to the support is convenient. After sticking the cushion layer, it is possible to cut or abrade the surface to form a desired shape. A more convenient method is a method of coating a liquid adhesive agent composition on a support with a definite thickness and curing the composition using light to form the cushion layer. In order to obtain cushioning properties, the hardness of the photo-cured composition is preferably small. The cured product layer of the light-sensitive resin having cushioning properties may contain bubbles.

<Laser Engraving>

In laser engraving, an image to be formed is converted to digital data, and a laser apparatus is operated based on the data utilizing a computer to form a relief image on the pattern-forming material.

As is described above, the pattern-forming material to be used for laser engraving is not particularly limited as to its use, it is particularly preferably used as a flexographic printing plate precursor for laser engraving.

As a laser to be used for the laser engraving, any one that can form a pattern on the pattern-forming material by laser ablation may be employed. In order to perform engraving at a high speed, however, a laser with a high output is desirable. Thus, lasers having an oscillation wavelength in the infrared or near-infrared region such as a carbonic acid gas laser, a YAG laser, a semi-conductor laser, and a fiber laser are some of preferred lasers. In addition, UV lasers having an oscillation wavelength in the UV ray region, such as an excimer laser, a YAG laser wavelength-converted to the third or fourth harmonic generation, and a copper vapor laser also permit ablation processing of cleaving the bonds in organic compound molecules, and are appropriate for fine processing. It is also possible to use a laser having an extremely high peak output such as a femtosecond laser. Also, irradiation with laser may be either continuous irradiation or pulse irradiation. With a flexographic printing plate precursor for laser engraving, a carbonic acid gas laser and a YAG laser are preferably used.

Engraving by a laser is performed in an oxygen-containing gas, generally in the presence of air or in a stream of air, and may also be performed in a carbonic acid gas or a nitrogen gas. After completion of engraving, powdery or liquid substances (tailings) produced on the relief image surface can be removed by an adequate method, for example, a method of washing away with a solvent or water containing a surfactant, a method of jetting an aqueous detergent by high-pressure spraying, a method of applying a high-pressure steam or a method of wiping off with cloth.

The composition of the invention can be utilized in various uses such as a stamp or seal, a design roll for embossing, an insulating body to be used for preparing electronic parts, a resistor, a relief image for patterning a conductor paste, a relief image as a mold material for ceramic products, a relief image for display such as an advertising or indicating board, and a prototype or mother mold for various moldings, as well as a relief image. In particular, the pattern-forming material of the invention is useful as a laser-engravable, flexographic printing plate precursor.

In addition, surface tack can be reduced by forming a modifying layer on the surface of a pattern image formed by laser engraving. As such modifying layer, there can be illustrated a film formed by treating with a compound which can react with hydroxyl groups on the surface of the pattern image, such as a silane coupling agent or a titanium coupling agent, and a polymer film containing porous inorganic particles. The silane coupling agent widely used is a compound having a functional group highly reactive with the hydroxyl group on the surface of the pattern image, and examples of such functional group include a trimethoxysilyl group, a triethoxysilyl group, a trichlorosilyl group, a diethoxysilyl group, a dimethoxysilyl group, a dimonochlorosilyl group, a monoethoxysilyl group, a monomethoxysilyl group, and a monochlorosilyl group. At least one of these functional groups exists and reacts with the hydroxyl group on the surface of the pattern image to thereby fix the agent to the surface. As another type of compounds constituting the silane coupling agents of the invention, those silane coupling agents which have at least one functional group selected from among an acryloyl group, a methacryloyl group, an active hydrogen-containing amino group, an epoxy group, a vinyl group, a perfluoroalkyl group, and a mercapto group and those silane coupling agents which have a long-chain alkyl group can be used as well. In the case where the coupling agent fixed to the surface has particularly a polymerizable reactive group, a stronger film can be formed by irradiating with light, heating or by irradiating with electron beams, after fixing the coupling agent to the surface, to thereby cause cross-linking.

EXAMPLES

Hereinafter, the invention will be described in more detail by reference to Examples which, however, do not limit the invention in any way.

Components (A) used in Examples are shown below.

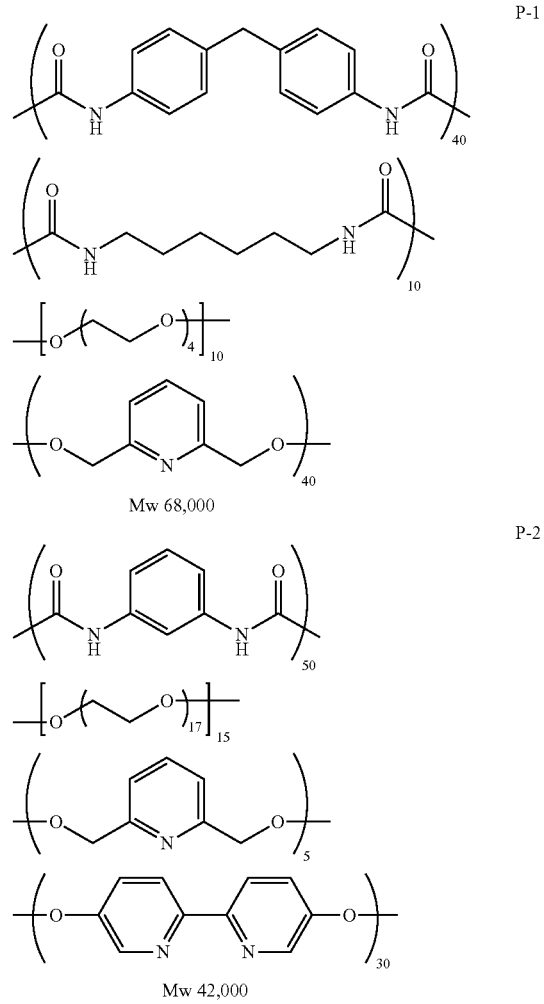

-continued

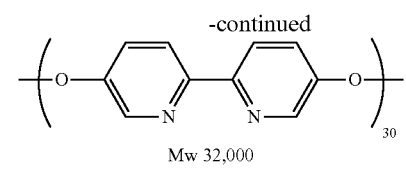
Mw 32,000

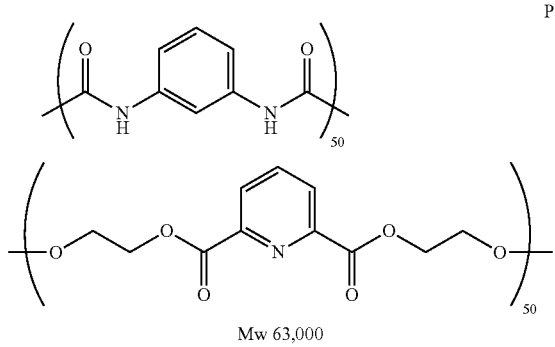
Mw 63,000

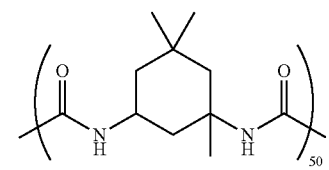

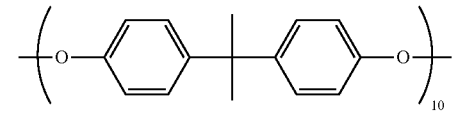
Mw 42,000

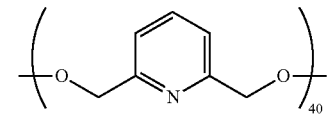
Mw 58,000

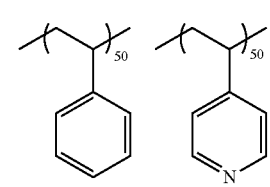

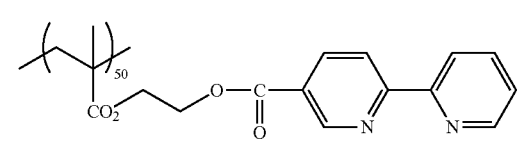
Mw 60,000

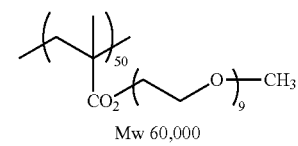

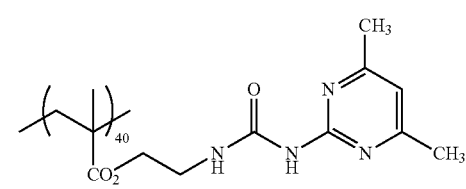

-continued

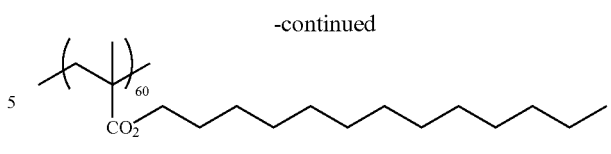
Mw 38,000

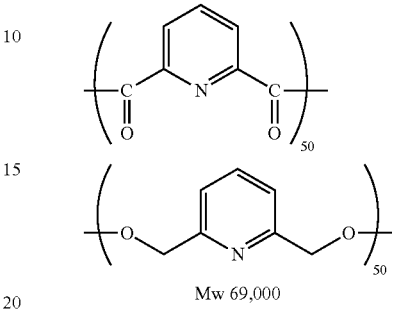
Mw 69,000

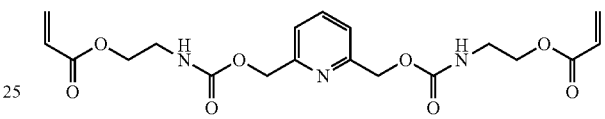

<Synthesis of Polymer P-1>

Pyridine-2,6-dimethanol (manufactured by Tokyo Chemical Industry Co., Ltd.; 8.64 g), tetraethylene glycol (manufactured by Wako Pure Chemical Industries, Ltd.; 3.01 g), bis(4-isocyanatophenyl)methane (manufactured by Wako Pure Chemical Industries, Ltd.; 16.30 g), 1,6-diisocyanatohexane (manufactured by Wako Pure Chemical Industries, Ltd.; 2.74 g), and tetrahydrofuran (manufactured by Wako Pure Chemical Industries, Ltd.; 60.00 g) are placed in a 500-ml three-neck flask equipped with a condenser, and are stirred in a stream of nitrogen at 50° C. for 30 minutes to uniformly dissolve. Thereafter, a bismuth-containing catalyst of NEOSTAN U-600 (manufactured by Nitto Kasei Co., Ltd.; 0.07 g) is added thereto, followed by heating at 60° C. for 7 hours under stirring. Thereafter, tetrahydrofuran (dehydrated) (manufactured by Wako Pure Chemical Industries, Ltd.; 100 g) and methanol (manufactured by Wako Pure Chemical Industries, Ltd.; 10 g) are added thereto, and the mixture is heated at 50° C. for 2 hours under stirring and is then allowed to cool to room temperature to obtain a solution of polymer P-1 in tetrahydrofuran (content of solid components: 13% by weight). The polymer P-1 is identified by gel permeation chromatography and, since it is found that the weight-average molelcular weight of the resulting polymer is 68,000 and that peaks derived from the starting materials disappear and only a peak derived from the polymer P-1 is found, it is confirmed that the whole starting materials are converted to the polymer P-1.

<Synthesis of Polymer P-6>

Styrene (manufactured by Wako Pure Chemical Industries, Ltd.; 52 g), 4-vinylpyridine (manufactured by Wako Pure Chemical Industries, Ltd.; 53 g) and, as a polymerization initiator, V-65 (manufactured by Wako Pure Chemical Industries, Ltd.; 1.2 g), and 1-methoxy-2-propanol (manufactured by Wako Pure Chemical Industries, Ltd.; 100 g) are placed in a 500-ml three-neck flask equipped with a condenser, and are stirred in a stream of nitrogen at 75° C. for 6 hours. Thereafter, the mixture is heated to 90° C., and then is allowed to cool, followed by adding thereto V-65 (manufactured by Wako Pure Chemical Industries, Ltd.; 1.2 g) and heating at 90° C. for 5 hours under stirring. After allowing to cool to room temperature, there is obtained a solution of polymer P-6 in 1-methoxy-2-propanol (content of solid components: 53% by weight). The polymer P-6 is identified by gel permeation chromatography and, since it is found that the weight-average molecular weight of the resulting polymer is 58,000 and that peaks derived from the starting materials disappear and only a peak derived from the polymer P-6 is found, it is confirmed that the whole starting materials are converted to the polymer P-6.

Additionally, other polymers are synthesized in the same manner.

<Synthesis of Polymerizable Compound M-1>

Pyridine-2,6-dimethanol (manufactured by Tokyo Chemical Industry Co., Ltd.; 25 g), Karenz AOI (manufactured by Showa Denko K.K.; 51 g), NEOSTAN U-600 (manufactured by Nitto Kasei Co., Ltd.; 1 mg), and tetrahydrofuran (manufactured by Wako Pure Chemical Industries, Ltd.; 200 g) are placed in a 500-ml eggplant type flask equipped with a condenser, and are stirred 50° C. for 48 hours. Thereafter, tetrahydrofuran is distilled off under reduced pressure to obtain an end product (76 g) as a colorless, transparent, oily liquid. This product is identified to be M-1 from the facts that characteristic peaks assigned to M-1 are observed in 1H-NMR and IR spectrum and that the purity is found to be 99% according to HPLC (high-pressure liquid chromatography; detecting wavelength: 254 nm; developing solvent: acetonitrile).

<Synthesis of Complex 1>

19 g of the polymer P-1 obtained in the aforesaid synthesis (as a solution in tetrahydrofuran), cobalt chloride (manufactured by Wako Pure Chemical Industries, Ltd.; 0.66 g), and tetrahydrofuran (manufactured by Wako Pure Chemical Industries, Ltd.; 50 g) are placed in a 100-ml eggplant type flask equipped with a condenser, and are subjected to ultrasonic wave irradiation for 30 minutes and, further, are heated at 50° C. for 4 hours under stirring to obtain a blue uniform solution. After allowing to cool to room temperature, the solution is poured into a polytetrafluoroethylene-made Petri dish. After drying at room temperature for 24 hours under ordinary pressure, the product is dried at 60° C. for 24 hours under reduced pressure to obtain a film (1 mm thick) of complex 1.

Other complexes are synthesized in the same manner using the components (A) and (B) in the same amounts as in the synthesis of the complex 1.

Additionally, the following compounds are used for adding the components (B) (metal ion).

$Co^{2+}$: $CoCl_2$ (manufactured by Wako Pure Chemical Industries, Ltd.)
$Fe^{2+}$: $FeCl_2$ (manufactured by Wako Pure Chemical Industries, Ltd.)
$Pd^{2+}$: $Pd(OCOCH_3)_2$ (manufactured by Wako Pure Chemical Industries, Ltd.)
$Cu^+$: $CuBr$ (manufactured by Wako Pure Chemical Industries, Ltd.)
$Ni^{2+}$: $NiCl_2$ (manufactured by Wako Pure Chemical Industries, Ltd.)

Examples 1 to 12 and Comparative Examples 1 to 3

<Evaluation of Thermal Properties>

10 g of each complex is heated in 100 ml of tetrahydrofuran at 60° C. for 1 hour under stirring, and then the solution is poured into a glass-made Petri dish to allow tetrahydrofuran to spontaneously evaporate, thus a composition sample being obtained.

If necessary, the solution is irradiated with ultrasonic wave (at room temperature for 15 minutes) before heating at 60° C. for 1 hour under stirring.

<Measurement of Thermal Properties>

The temperature at which thermal decomposition of each sample initiates is measured under the following conditions. The term "temperature at which thermal decomposition of each sample initiates" as used herein means a temperature at which weight reduction due to thermal gradation of the sample initiates as the sample is heated.

<Apparatus>

Thermogravimeter (manufactured by T. A. Instrument Japan)

<Measuring Conditions>

10 g of each samples is weighed, and heated from 30° C. to 500° C. at a temperature-raising rate of 20° C./minute.

Results are shown in Table 1.

TABLE 1

| | Complex | Polymer | Metal Ion | Temperature at which Thermal Decomposition of Sample Initiates (° C.) |
|---|---|---|---|---|
| Example | | | | |
| 1 | 1 | P-1 | $Co^{2+}$ | 180 |
| 2 | 2 | P-1 | $Fe^{2+}$ | 225 |
| 3 | 3 | P-2 | $Pd^{2+}$ | 185 |
| 4 | 4 | P-3 | $Cu^+$ | 210 |
| 5 | 5 | P-4 | $Ni^{2+}$ | 211 |
| 6 | 6 | P-5 | $Ru^{3+}$ | 223 |
| 7 | 7 | P-6 | $Co^{2+}$ | 245 |
| 8 | 8 | P-7 | $Co^{2+}$ | 230 |
| 9 | 9 | P-8 | $Co^{2+}$ | 230 |
| 10 | 10 | P-9 | $Co^{2+}$ | 235 |
| 11 | 11 | P-1 (5 g) + M-1 (5 g) | $Co^{2+}$ | 170 |
| 12 | 12 | M-1 | $Co^{2+}$ | 230 |
| Comparative Example | | | | |
| 1 | Comparative Sample 1 | P-1 | none | 285 |
| 2 | Comparative Sample 2 | CP-1 | $Co^{2+}$ | 280 |
| 3 | Comparative Sample 3 | M-1 | none | 290 |

The structure of polymer CP-1 used in Comparative Example 2 is as shown below.

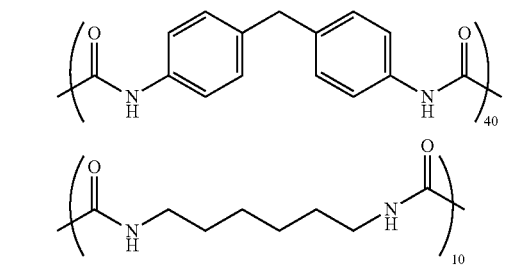

-continued

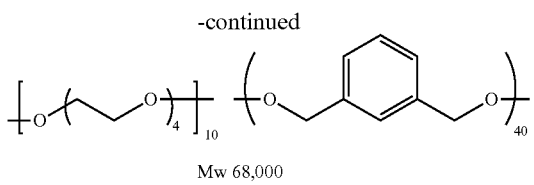

Mw 68,000

It is seen that, in comparison with samples of Comparative Examples, samples of Examples show a lower temperature at which thermal decomposition thereof initiates than samples using only polymer and, therefore, that they are excellent in thermal decomposability.

Examples 13 to 19 and Comparative Examples 4 to 6

<Evaluation of Laser Decomposability>

TABLE 2

| Components of Relief Layer | Starting Materials | Weight (% by weight) |
|---|---|---|
| Complex | shown in Table 1 | 60.0 |
| Polymerizable Compound | Hexanediol dimethacrylate | 15.00 |
| | Lauryl acrylate | 20.00 |
| Initiator | Irgacure 184 (manufactured by Ciba Geigy) | 5.00 |

Upon forming on a support a relief layer shown in Table 2, each film of the complex obtained in the foregoing Examples cut into small pieces by scissors, the polymerizable compound, and the initiator are mixed in a kneader for laboratory use at a material temperature of 100° C., and are cast onto an uncovered, 125-μm thick PET film. The cast mixture is dried at room temperature for 48 hours in the air, and then dried at 90° C. for 1.5 hours. Subsequently, the thus-obtained relief layer (1000-μm thick) is laminated on a second 125-μm thick PET film coated with a mixture of adhesive components, followed by delaminating the uncovered 125-μm thick PET film to prepare a sample.

The following treatment is performed as needed.

<Heating for Cross-Linking the Film>

The relief layer prepared above is heated in an oven equipped with an exhaust system at 160° C. for 20 minutes under ordinary pressure to cross-link the film. Completion of cross-linking of the relief layer is confirmed by checking disappearance of peaks derived from carbon-carbon unsaturated bond by FT-IR.

The engraving depth upon laser engraving of the relief layer is used as an indication of laser decomposability. A sample engraved to a larger depth by laser irradiation with the same energy is shown to have a higher laser decomposability. In the experiments of evaluating engraving depth by a laser, 10 squares (1 cm×1 cm) are engraved by using, as a carbonic acid gas ($CO_2$) laser, "High-grade $CO_2$ Laser Marker ML-9100 series (manufactured by KEYENCE)" with 12 W at a line speed of 10 cm/sec or using, as a Nd-YAG laser, "MARKER ENGINE 3000 (manufactured by Laser Front Technologies, Inc.)" with 10 W at a line speed of 10 cm/sec.

Regarding the laser decomposition sensitivity, engraving depth is measured by using a high-speed, high-accuracy CCD laser displacement meter, LK-G35 (manufactured by KEYENCE). Measurement is performed with all 10 squares, and the average value thereof is employed.

In addition, resolution (edge shape in engraved portions) is similarly observed by using a high-speed, high-accuracy CCD laser displacement meter, LK-G35 (manufactured by KEYENCE).

Results are shown in Table 3.

TABLE 3

| | Complex | Polymer | Metal Ion | Kind of Laser | Depth of Engraving (μm) | Edge Shape |
|---|---|---|---|---|---|---|
| Example | | | | | | |
| 13 | 1 | P-1 | $Co^{2+}$ | $CO_2$ | 505 | sharp |
| 14 | 2 | P-1 | $Fe^{2+}$ | " | 460 | " |
| 15 | 3 | P-2 | $Pd^{2+}$ | " | 490 | " |
| 16 | 4 | P-3 | $Cu^+$ | " | 470 | " |
| 17 | 7 | P-6 | $Co^{2+}$ | " | 475 | " |
| 18 | 11 | P-1 and M-1 are used in a weight ratio of 1:1. | $Co^{2+}$ | " | 520 | " |
| 19 | 1 | P-1 | $Co^{2+}$ | Nd-YAG | 155 | " |
| Comparative Example | | | | | | |
| 4 | comparative sample 1 | P-1 | none | $CO_2$ | 215 | molten |
| 5 | comparative sample 2 | CP-1 | $Co^{2+}$ | " | 205 | molten |
| 6 | comparative sample 1 | P-1 | none | Nd-YAG | 25 | molten |

It is seen from Table 3 that, in comparison with samples of Comparative Examples, relief layers containing the complexes serving to improve thermal decomposability of the polymer as shown in the foregoing Table 1 permit deeper engraving due to the effect of improving thermal decomposability. This means that engraving sensitivity is improved. In addition, in the case where these complexes are incorporated, the edges of engraved portions do not melt, and give extremely sharp and good shapes. This means that resolution of each layer is good.

As is described above, according to the invention, there are provided a composition for use in laser decomposition, which can be utilized as a thick film, which has a high engraving sensitivity, which permits effective engraving with a low laser energy, and which has a good resolution, and a pattern-forming material using the composition.

The entire disclosure of each and every foreign patent application from which the benefit of foreign priority has been claimed in the present application is incorporated herein by reference, as if fully set forth.

What is claimed is:

1. A composition for use in laser decomposition, comprising:
   (A) both of a polyurethane resin containing a nitrogen atom-containing hetero ring as a repeating unit in a main chain and a polymerizable compound having a nitrogen atom-containing hetero ring, which has two or more terminal ethylenically unsaturated bonds; and
   (B) a metal ion;
   wherein the composition is cross-linked by light or heat.

2. The composition according to claim 1, comprising:
   a complex formed from the component (A) and the component (B).

3. The composition according to claim 1, wherein
   the component (B) is contained in amount of from 0.05 to 20 mol based on 1 mol of the component (A).

4. The composition according to claim 1, further comprising:
   a polymerizable compound other than the component (A).

5. A pattern-forming material comprising:
   a support; and
   a layer that comprises the composition according to claim 1.

6. The pattern-forming material according to claim 5, which is a laser engravable flexographic printing plate precursor.

* * * * *